United States Patent
Yoshida et al.

(10) Patent No.: US 6,690,417 B1
(45) Date of Patent: Feb. 10, 2004

(54) IMAGE PROCESSING METHOD, AN IMAGE PROCESSING APPARATUS, AN IMAGE INPUT DEVICE, A PHOTOGRAPHING DEVICE, A PHOTOGRAPHING SYSTEM, A COMMUNICATION DEVICE, A COMMUNICATION SYSTEM, AND A STORAGE MEDIUM

(75) Inventors: Shigeo Yoshida, Yokohama (JP); Hiraku Sonobe, Yokohama (JP); Satoshi Ono, Yamoto (JP); Keiji Ohara, Yokohama (JP); Shinichi Matsumoto, Yokohama (JP); Takayuki Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/162,720

(22) Filed: Sep. 30, 1998

(30) Foreign Application Priority Data

Sep. 30, 1997 (JP) .............................. 9-266616
Sep. 11, 1998 (JP) ............................ 10-258182

(51) Int. Cl.$^7$ ......................... H04N 5/76; H04N 5/228; H04B 1/38; G06F 12/00
(52) U.S. Cl. ............................. 348/231.1; 348/222.1; 455/556; 455/557; 711/170
(58) Field of Search ................................ 348/222, 231, 348/233, 333.01, 333.02, 333.04, 207.1, 222.1, 231.1; 455/556, 567; 711/170–172

(56) References Cited

U.S. PATENT DOCUMENTS

| | | | | |
|---|---|---|---|---|
| 5,473,366 A | * | 12/1995 | Imaeda et al. ................ | 348/14 |
| 5,491,507 A | | 2/1996 | Umezawa et al. ............ | 348/14 |
| 5,666,159 A | * | 9/1997 | Parulski et al. .............. | 348/211 |
| 5,774,186 A | * | 6/1998 | Brodsky et al. ............. | 348/553 |
| 5,986,700 A | * | 11/1999 | Wakui ......................... | 348/231 |
| 6,094,219 A | * | 7/2000 | Roberts et al. .............. | 348/207 |
| 6,111,605 A | * | 8/2000 | Suzuki ........................ | 348/220 |
| 6,115,137 A | * | 9/2000 | Ozawa et al. ................ | 348/231 |
| 6,137,525 A | * | 10/2000 | Lee et al. ...................... | 348/14 |
| 6,166,729 A | * | 12/2000 | Acosta et al. ................ | 345/327 |
| 6,219,560 B1 | * | 4/2001 | Erkkila et al. ............... | 348/233 |
| 6,487,366 B1 | * | 11/2002 | Morimoto et al. ...... | 348/333.01 |

FOREIGN PATENT DOCUMENTS

JP       06268582        9/1994        ............ H04B/7/26

* cited by examiner

Primary Examiner—Wendy R. Garber
Assistant Examiner—Lin Ye
(74) Attorney, Agent, or Firm—Fitzpatrick, Cella, Harper & Scinto

(57) ABSTRACT

A method for processing images comprises the steps of performing the reception of data through the net work, inputting image data obtainable in accordance with the designated input mode, managing the storage of the data received in the receiving step and the image data inputted in the input step to the memory, and intervening between the operations of the reception step and the input step in accordance with the storage management in the controlling step. With the method thus structured, the compression ratio of the input image is heightened by changing the current photographing mode if the added value of the estimated reception data through communicating means and the data side of photographed image predetermined by the current photographing mode should exceed the remainders of memory in the storage, hence making it possible to implement the compatibility of immediacy between the image input and the communication by dealing with any sudden reception during photographing.

21 Claims, 22 Drawing Sheets

(1)-2 PLAY BACK OPERATION

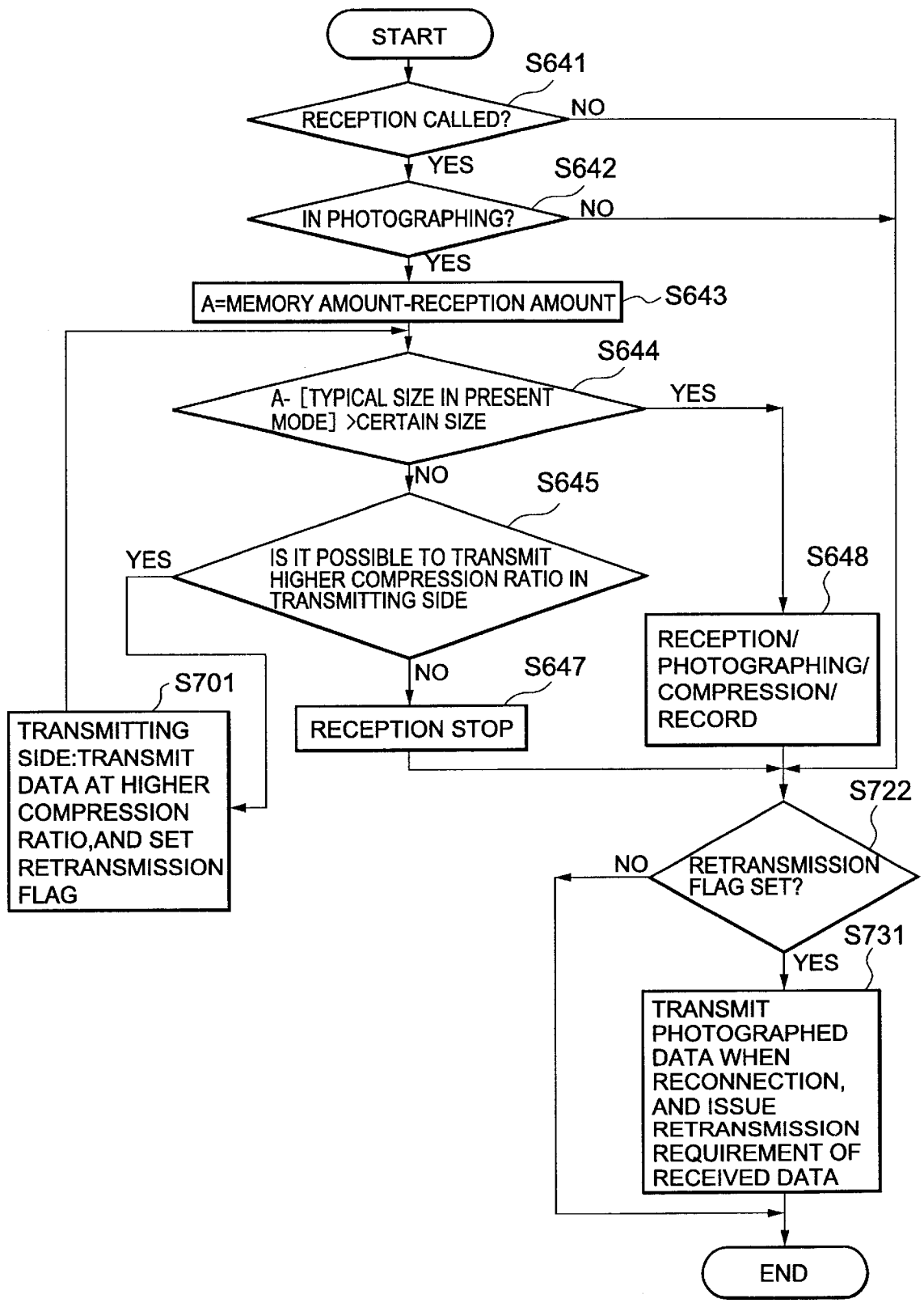

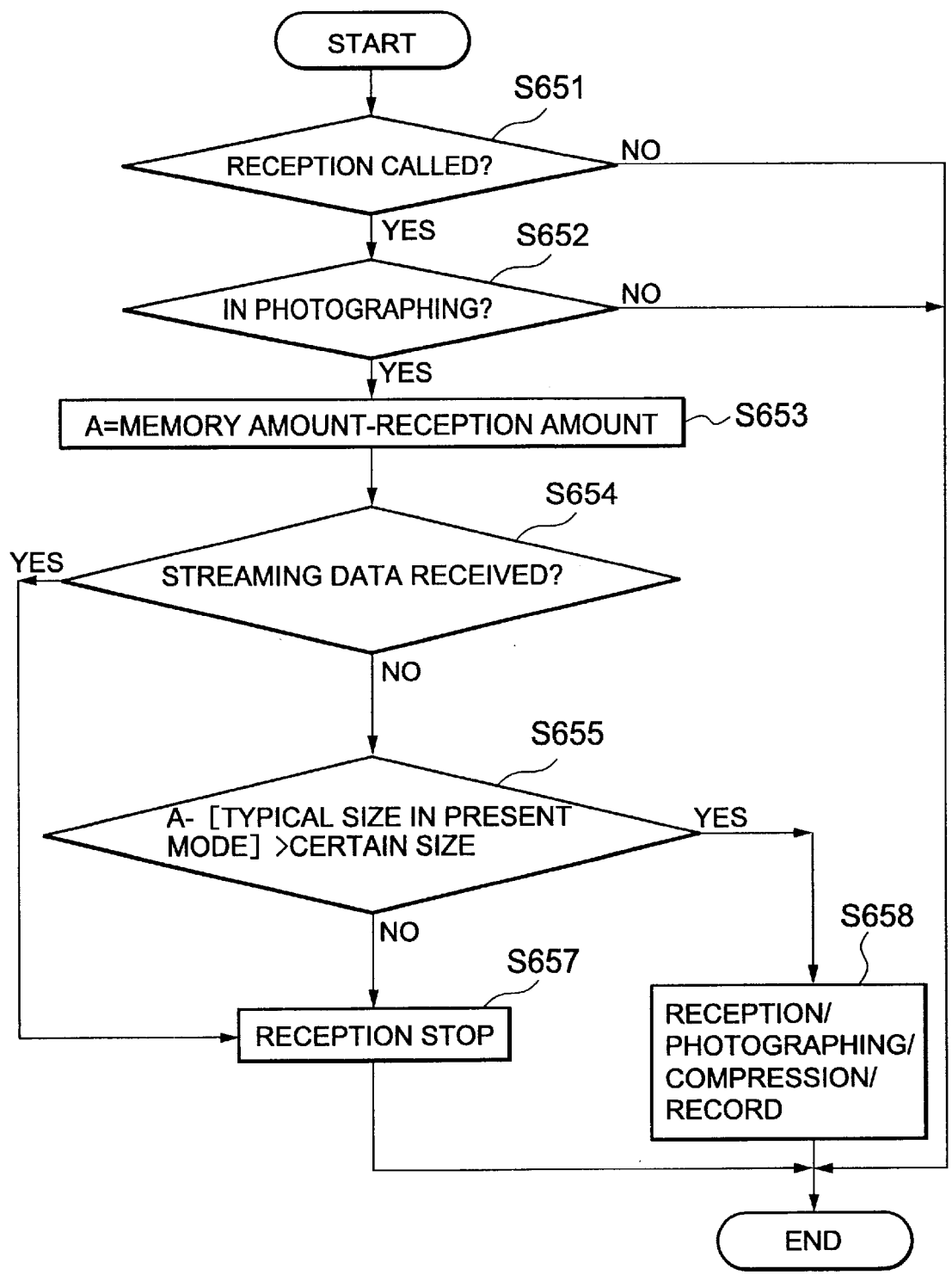

IMAGE PROCESSING METHOD, AN IMAGE PROCESSING APPARATUS, AN IMAGE INPUT DEVICE, A PHOTOGRAPHING DEVICE, A PHOTOGRAPHING SYSTEM, A COMMUNICATION DEVICE, A COMMUNICATION SYSTEM, AND A STORAGE MEDIUM

BACKGROUND OF THE INVENTION

1. Field of the Invention

The present invention relates to digital cameras and the like. More particularly, the invention relates to an image input device, a photographing device, and a photographing system, which are provided with communicating functions, and to a communication device and a communication system, which perform transmission and reception of images or the like. The invention also relates to a storage medium that stores processing steps readable by a computer for controlling the operations of these apparatuses, devices, or systems.

2. Related Background Art

Along with the technical advancement of semi-conductor and other technology, the spread of digital cameras has been remarkable in recent years. The digital camera digitizes photographed images and stores them in an image memory. For the image memory a semiconductor storage is often used.

However, since semiconductor storage is extremely expensive, there is automatically a limit as to the capacity of the semiconductor storage that can be used in a digital camera in consideration of the overall cost of the digital camera. In other words, the number of photographs that can be taken is limited. At present, the standard capacity of the semiconductor storage provided for a digital camera is not large enough for the photographing frequency usually anticipated for a camera.

Now, for example, there is a digital camera that uses an exchangeable storage device, such as a PCMCIA flash memory card, a smart memory, so that the number of photographs that can be taken by such a camera is increased by allowing the user to exchange the image storage in accordance with his requirement.

Conceivably, however, there may be a case where a new image storage is obtainable when the user wishes to replace the storage that has become full. As a result, the user has to estimate the number of photographs that he may wish to take beforehand, and bring with him a sufficient number of PCMCIA flash memory cards.

Alternatively, in order to provide capacity for a sufficient number of photographs to be taken, it may be possible to use some other media than semiconductor storage, such as a hard disc or other magnetic storage. Nevertheless, even if a magnetic storage is used as the image memory, its capacity is not infinite.

Therefore, the number of photographs that may be taken by the aforesaid digital camera is limited by the capacity of the built-in image storage or the availability of exchangeable storage devices used. Under such circumstances, if pictures cannot be taken on the photographing site in numbers beyond such limit, for example, it is necessary to erase any unwanted pictures that have been taken and stored in the image storage, or else to transfer the stored images to the storage device or the like in a personal computer. With an operation of this kind, it is possible to increase the capacity of the image storage for use.

However, the requirement of such operations as described above that would not be carried out on the photographing site results in the inevitable loss of time, and this becomes a significant drawback in using a digital camera for which immediacy is essential.

More specifically, when an unwanted picture has to be erased from among the images that have been photographed, it is imperative to confirm various pieces of information to determine which one of the images can be discarded. Making such confirmation exactly becomes a great burden on the photographer. In some cases, it is not easy to determine whether or not the photographed image is readily usable through the small display screen generally provided for a digital camera.

Further, in order to enable the aforesaid confirmation to be made efficiently, there is a need to such provision of a new group of operational switches or a display screen dedicated for the confirmation. This may stand in the way of making the digital camera smaller.

Furthermore, it may represent a psychological burden on the photographer if any one of the images that he has taken should be erased on the photographing site, and such an erasure may result in an intense sense of denial.

On the other hand, when the photographed images are transferred to the storage device in a personal computer, such burdens as described above are not imposed upon the photographer, but the interface or the like to perform such transfer between the digital camera and the personal computer must be carried around by the photographer. As a result, the physical burden on him becomes greater.

Here, therefore, in order to solve the above problems, it is conceivable to provide a digital camera with communicating functions, for example, so that the photographed images or electronic mails are transmitted or received as required.

Nevertheless, with a digital camera that may be structured to enable it to perform communications, a collision of requests for access to a memory may occur if one and the same memory is used to store photographed images and the data on transmission and reception. Then, there will be created a new problem that may have not been encountered with a digital camera which is provided only with the photographing functions. For example, if the memory which is intended to be used for the storage of a photographed image should be occupied in receiving data at the very moment the photographer is about to take a picture, photographing is, thus, no longer executable.

In order to avoid a problem of this kind, the photographer is required to determine on the site whether or not such communication should be received at the moment he is notified of a communication call. Then, it becomes impossible to maintain the immediacy of photography, and there is a good possibility that a photo op will be lost eventually. A problem of this kind presents a significant drawback in using a digital camera.

Also, it is conceivable that the reception (received) data is not all stored if the photographing function should operate during communication. This may produce an unfavorable effect on the reliability of communication. As a result, it may also present a significant drawback in using a digital camera which is provided with the communicating function.

SUMMARY OF THE INVENTION

The present invention is designed in consideration of the problems described above. It is an object of the invention to solve one or more of these problems.

It is another object of the invention to lessen the restrictions on the functions of the apparatus due to the capacity of its storage.

It is still another object of the invention to avoid marring the immediacy of image recording. It is a further object of the invention to provide an image input device, a photographing device, a communication device, a communication system, and a storage medium that stores the processing steps readable by a computer for the operational control of these apparatuses, devices, or systems, which make it possible to provide a digital camera whose performance is enhanced while the camera itself is kept small, and retains its immediacy of photography.

In order to achieve the above-mentioned objects, one embodiment of the present invention is a method for processing images comprising the steps of performing the reception of data through a network; inputting image data obtained in accordance with a designated input mode; managing the storage of the data received in the receiving step and the image data inputted in the input step in memory; and intervening between the operations of the reception step and the input step on the basis of the storage management in the managing step.

Within such method, it becomes possible to deal with any sudden reception or the like during the storing of image data in the memory, because the data reception operation and the image input operation are controlled in accordance with the current status of memory storage. As a result, the compatibility of immediacy can be implemented as between image inputting and communication.

Also, the aforesaid reception step further comprises the step preferably of receiving data through a wireless network. Thus, it is possible to deal with communication through the wireless network.

Also, the aforesaid intervening step preferably further comprises a control step, of controlling the input mode in the input step in accordance with the storage management in the management step.

In this way, it becomes possible to control the storing of the image data in the memory by changing the current input modes in accordance with the status of the memory storage.

Also, the aforesaid input step preferably further comprises an irreversible-compression step, and the intervening step preferably further comprises a control step for controlling the compression ratio in the compression step.

In this way, it becomes possible to control the amount of image data to be stored on the memory by changing the compression ratios in accordance with the status of the memory storage.

Moreover, the aforesaid management step preferably further comprises a step of managing the remaining storage capacity of the memory. Hence, it is possible to control the data reception operation and the image input operation in accordance with the remainders (remaining amount) of the storage capacity of the memory.

It is still another object of the present invention to provide a photographing apparatus having new functions, a communicating device, or a storage medium for the execution of the functions of such apparatus by use of a computer.

Other objectives, features and advantages besides those discussed above will be apparent to those skilled in the art from the description of the preferred embodiments of the invention which follows. In the description, reference is made to the accompanying drawings, which form a part hereof, and which illustrate an example of the invention.

Such example, however, is not exhaustive of the various embodiments of the invention, and therefore, reference is made to the claims which follow the description for determining the scope of the invention.

BRIEF DESCRIPTION OF THE DRAWINGS

FIG. 21 is a flowchart which illustrates the program to execute control of the amount of receiving data for the digital camera represented in FIG. 1 in accordance with a fifth embodiment of the present invention.

FIG. 22 is a flowchart which illustrates the program to execute control of streaming data received by the digital camera represented in FIG. 1 in accordance with a sixth embodiment of the present invention.

DETAILED DESCRIPTION OF THE PREFERRED EMBODIMNTS

Hereinafter, in conjunction with the accompanying drawings, description will be made of the preferred embodiments in accordance with the present invention.

(First Embodiment)

Figure 1:
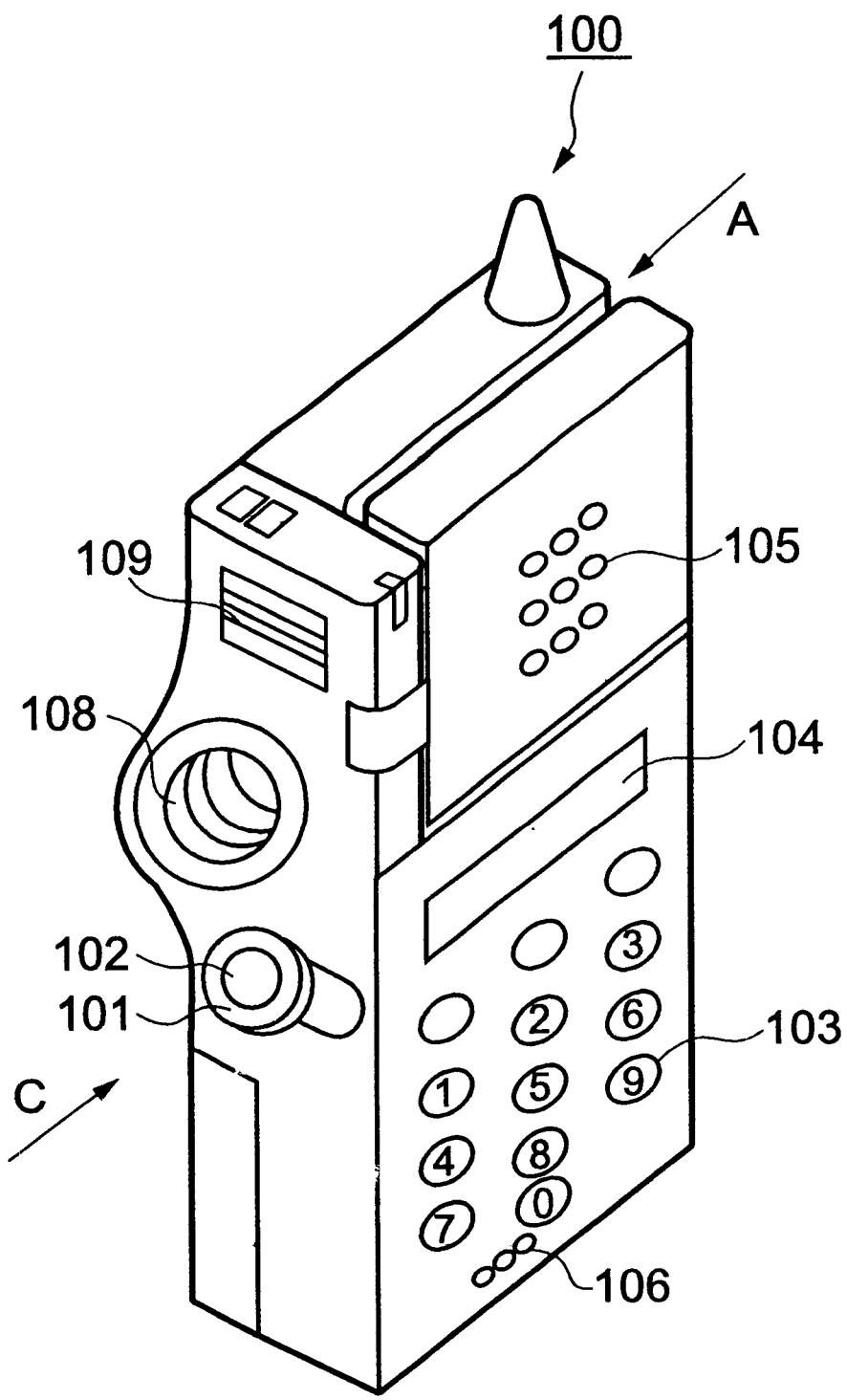
FIG. 1 is a view which shows the outer appearance of the front of a digital camera that executes a method for processing images in accordance with a first embodiment of the present invention.

The image processing method of the present invention will be executed by a digital camera shown in FIG. 1, for example.

The image processing apparatus or the image input device of the present invention is applicable to this digital camera 100.

Here, in accordance with the first embodiment, the digital camera 100 is provided with the communicating function, such as telephone, electronic mail, etc., and as shown in FIG. 1 (which shows the outer appearance of the apparatus), there are provided on the front of the digital camera 100 a shutter button 102, a mode dial 101, a lens 108, and a stroboscope 109 which is arranged above the lens 108.

Also, on the side end of the digital camera 100 main body, there are arranged a speaker 105, a black and white liquid crystal display 104, a keyboard 103, a jog dial (not shown) which will be described later, and a microphone 106 incorporated in the main body of the digital camera.

Figure 2:
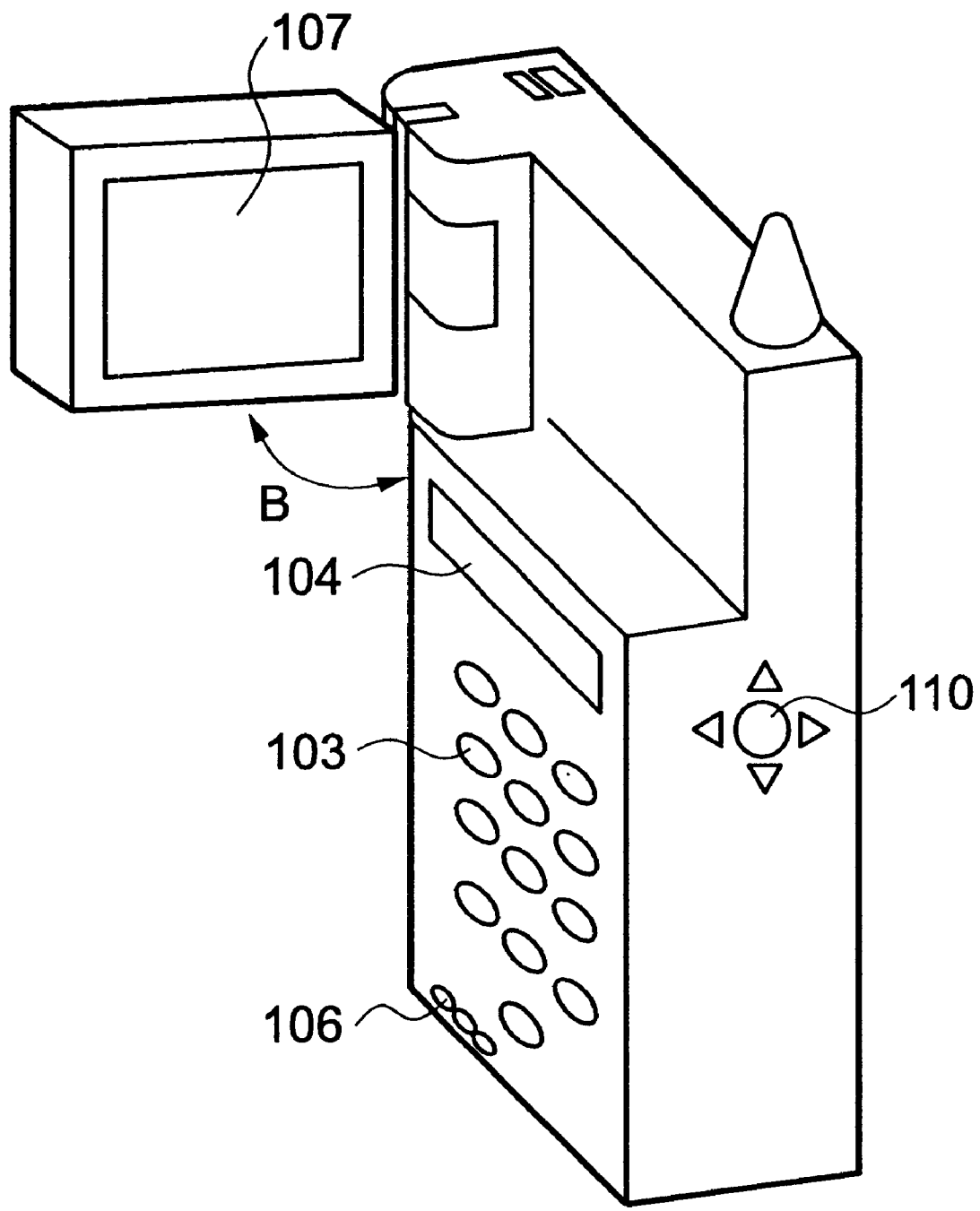
FIG. 2 is another view which shows the outer appearance of the digital camera represented in FIG. 1.

Further, on the surface opposite to that where the shutter button 102, the mode dial 101, the lens 108, and the stroboscope 109 are arranged, a pointing device 110 is provided as shown in FIG. 2 (which shows the outer appearance of the apparatus, observed in the direction indicated by arrow A in FIG. 1).

Furthermore, as shown in FIG. 2, the portion where the speaker 105 is provided is arranged in such a manner that it is freely opened (moved out from) or closed (moved up to the digital camera 100 main body) in the direction indicated by arrow H. The structure is arranged so that a color liquid crystal display 107 is made observable when this portion is open.

Figure 3:
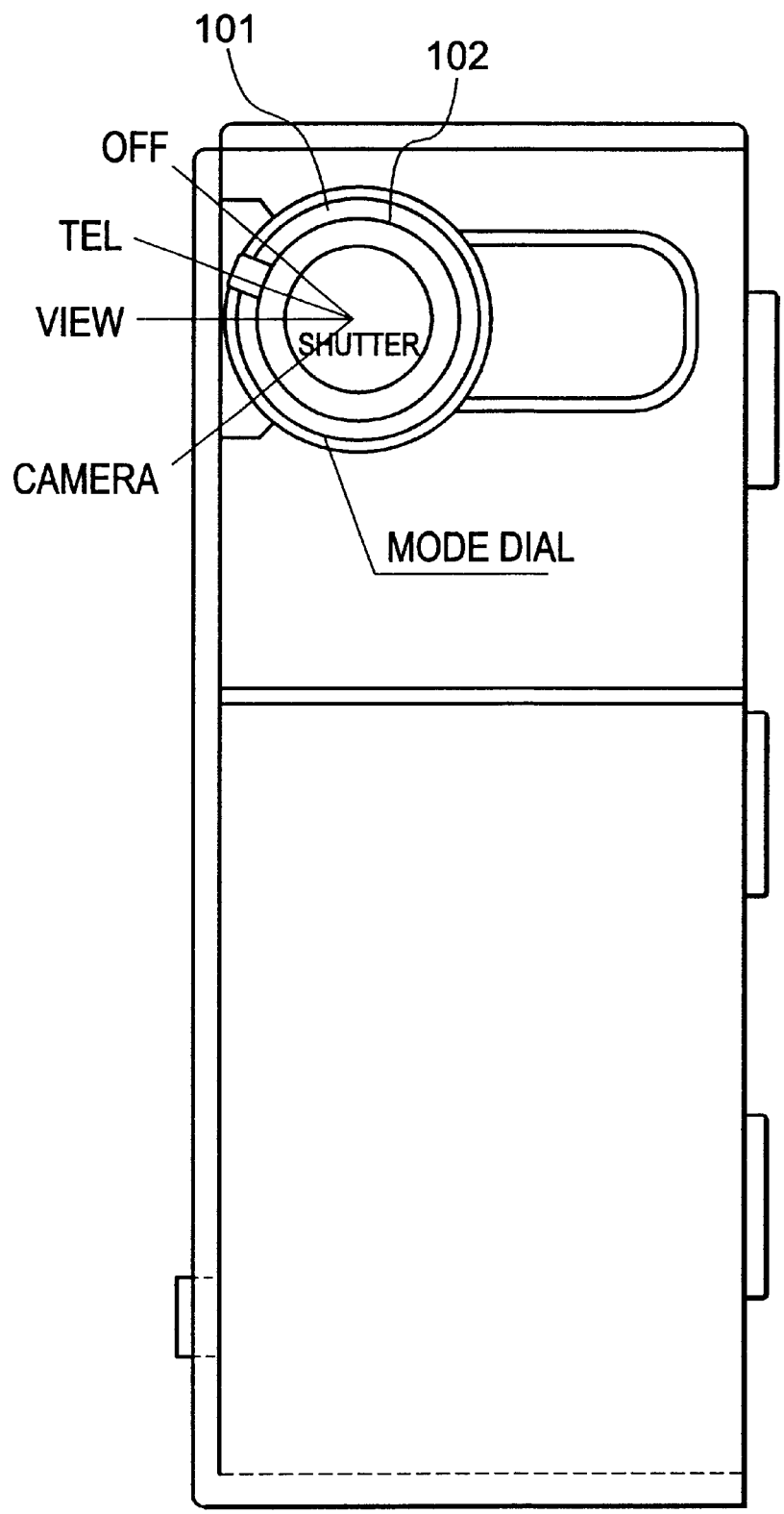
FIG. 3 is a view which illustrates the mode dials of the digital camera represented in FIG. 1.

Here, the mode dial 101 is also provided with the power switching function, and as shown in FIG. 3 (the front view of the mode dial 101, observed in the direction indicated by an arrow C in FIG. 1), this dial is structured so as to be rotatable around the shutter button 102.

Then, with the rotation of this mode dial 101, it is possible to switch the modes in which the power-supply is turned off (OFF mode); the telephone is made ready for transmission and reception (TEL mode); the image, audio, text and other information, which are stored in the main body of the digital camera 100, are indicated on the display (VIEW mode); and some more (see below).

Figure 4:
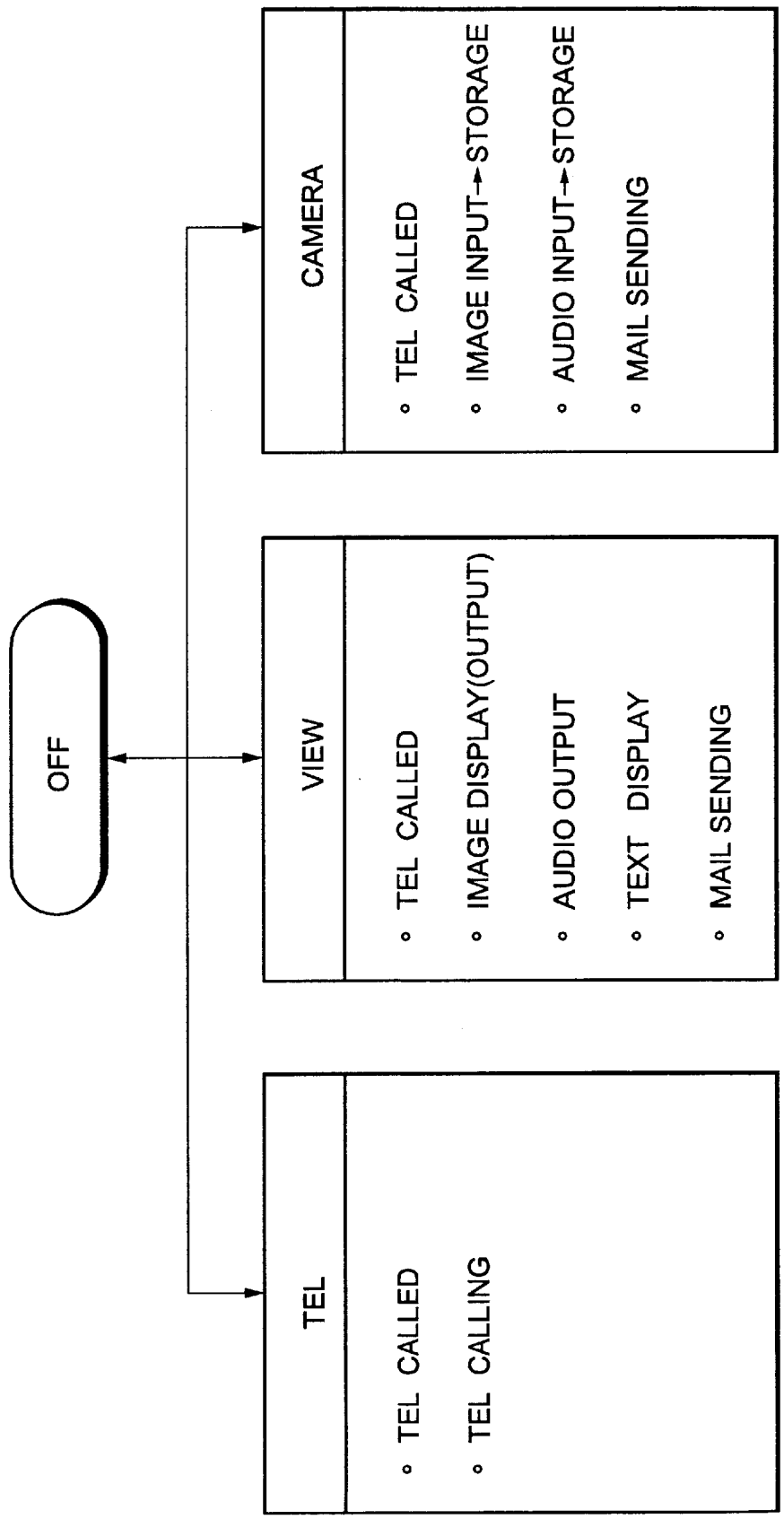
FIG. 4 is a view which illustrates each of the functions of the digital camera represented in FIG. 1.

Here, FIG. 4 shows the respective functions of each of the modes of the digital camera 100 represented in FIG. 1.

As shown in FIG. 4, the telephone call can be received (the TEL called function is ready) in the modes other than the OFF mode.

In the TEL mode, the usual PHS (personal handy-phone system) telephone set becomes operative (that is, the TEL called and TEL calling functions are ready). In other words, it becomes possible to input a telephone number from the keyboard 103 on the digital camera main body, to indicate the input number on the black and white LCD 104, and to indicate on it the telephone numbers stored in advance (the display of a personal telephone directory) in the TEL mode. Then, the transmission and reception of a telephone call are made by use of the speaker 105 and the microphone 105 incorporated in the digital camera main body.

Also, in the TEL mode, indications are made possible on the color LCD 107 as required so as to select any one of the complicate optional functions easily by the application of color-coding or the like.

Here, the phrase "the transmission and reception of a telephone call" means to include the data communication that may be executable by use of the PHS telephone set, the portable telephone set or the like.

In the VIEW mode, the arrangement is made to select either the image obtained by photographing in the CAMERA mode (which will be described later), the recorded audio, the received image and audio, or the text, and then, to reproduce any one of them or to display it (that is, the image display/output function, audio output function, text display function, and electronic mailing function).

In the CAMERA mode, although the details will be described later, a photographic image of an object taken via the lens 108 is photoelectrically converted into electric signals by means of a CCD (charge coupled device) or some other photographing device, and stored in a flash memory or other storage device after given image processes are executed as required (that is, the image input/storage function).

Also, in the CAMERA mode, it is possible to select, by use of the pointing device 110, the condition of stroboscopic emission from among those on the menu shown on the color LCD 107, and to illuminate the object under the condition thus selected.

Further, in the CAMERA mode, it is possible to confirm the image obtained by photographing, by use of the playback function which will be described later, and then, to erase it if unwanted or to record audio data as an annotation (that is, using the audio input/storage function), or to send it to a desired party as the electronic mail (using the electronic mail function).

Figure 5:
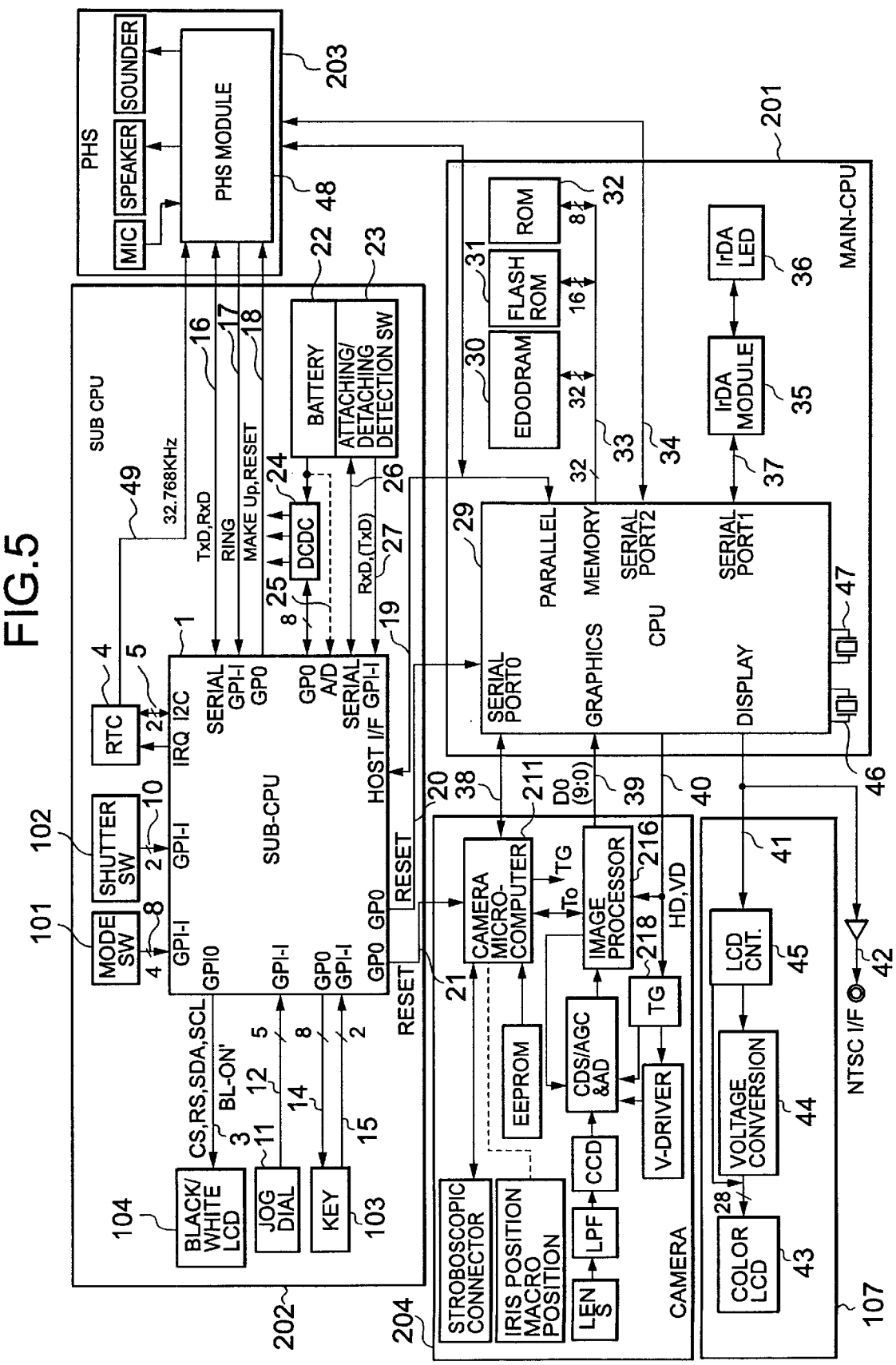
FIG. 5 is a block diagram which shows the inner structure of the digital camera represented in FIG. 1.

The inner structure of such digital camera 100 as described above is mainly arranged with the main CPU unit 201, the sub-CPU unit 202, the PHS unit 203, and the camera unit 204 as shown in FIG. 5, for example. With the cooperative operations of each of the units, it becomes possible for the TEL mode, the VIEW mode, and the CAMERA mode to execute each of the functions as given below.

Now, hereinbelow, the specific description will be made of the main CPU unit 201, the sub-CPU unit 202, the PHS unit 203, and the camera unit 204.

(1) Camera Unit 204

Figure 6:
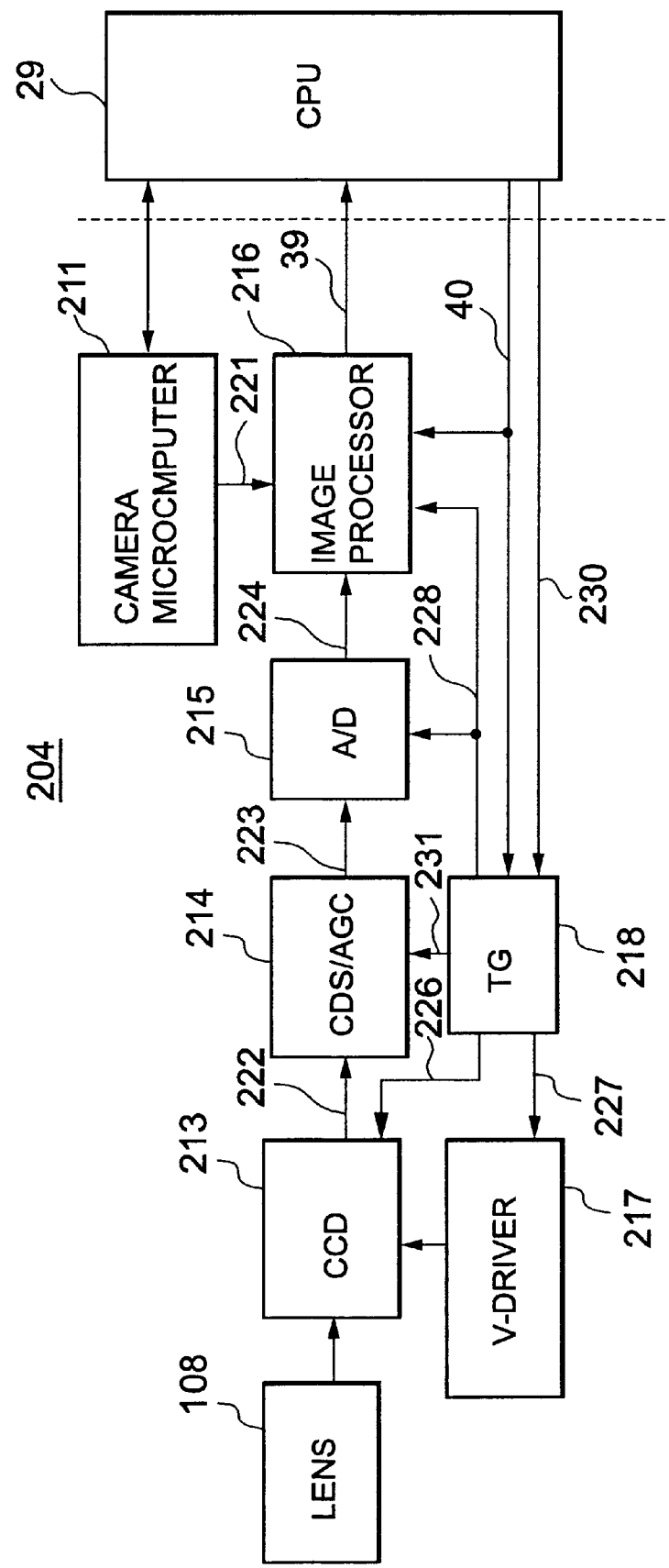
FIG. 6 is a block diagram which shows the details of the structure of the camera unit of the digital camera represented in FIG. 1.

FIG. 6 is a diagram which specifically shows the camera unit 204 represented in FIG. 5.

As shown in FIG. 6, the camera unit 204 comprises the photographing device 213 where the incident light from the lens 108 shown in FIG. 1 is focused into an image on the photographing plane; the CDS/AGC circuit 214 to which is supplied the output of the photographing device 213; the A/D converter 215 to which is supplied the output fiom the CDS/AGC circuit 214; the signal processing circuit (image processor) 216 to which is supplied the output of the A/D converter 215; and the camera microcomputer 211 which is connected with the CPU 29 (FIG. 5) of the main CPU unit 210 which will be described later in detail. The output from the camera microcomputer 211 is supplied to the image processor 216. Then, the output from the image processor 216 is supplied to the CPU 29.

Also, the camera 204 is provided with the timing generator 218 to which the output from the CPU 29 is supplied, and also, provided with the vertical driver 217 to the output from the timing generator 218 is supplied. The output from the timing generator 218 is supplied to each of the photographing device 213, the CDS/AGC circuit 214, the A/D converter 215, and the image processor 216. The output from the vertical driver 217 is supplied to the photographing device 213.

Further, the output from the CPU 29 is supplied to the image processor 216.

In the camera unit 204 thus arranged, the camera microcomputer 211 controls the entire operation of the camera unit 204 by communicating with the CPU 29 which controls the operation of the entire body of the apparatus. For example, the camera microcomputer 211 controls the operation of the respective image processes when receiving the information of the lens position of the lens 108 (FIG. 1), and transfers the information to the CPU 29 so as to prompt the user's operation in accordance with the aperture condition.

More specifically, at first, the lens 108 is a zoom lens of the three-time magnification, which is structured to shift the zooming positions manually, for example. In terms of a 35 mm camera, it has a focal length of 24 mm to 103 mm. Then, this lens position is given to the camera microcomputer 211 by means of a hole device (not shown). Therefore, in accordance with given lens positions of the lens 108, the camera microcomputer 211 controls the operation of the camera 204 so as to perform various image processes.

Meanwhile, as to brightness, the lens is provided with a stop setting of F2.4 to F3.5, and between the lens 108 and the photographing device 213, there are also provided two kinds of optical apertures, open and stop-down, although not shown in FIG. 6. These apertures are manually operated. Then, the camera microcomputer 211 detects the aperture positions to transfer the detected result to the CPU 29. Therefore, the CPU 29 is arranged to give warning or the like to the user when the amount of light is insufficient or excessive in accordance with the detected result of the camera microcomputer 211.

Also, the stroboscope 109 is provided with the lighting adjustment circuit. The charging and light emitting are also controlled by the camera micro-computer 211. In other words, the stroboscope 109 varies the reference level of the light adjusting control in accordance with the lens positions of the lens 108 (the zoom lens) provided by the camera micro-computer 211. Therefore, irrespective of the lens positions of the lens 108, it is possible to obtain an appropriate light emission.

In this respect, the CPU 29 is, although described later in detail, formed by an IC of inclusive type having a memory controller and serial interface in it, which controls the operation of the entire body of the device or apparatus.

By the control made by the camera microcomputer 211 thus arranged, the camera 204 operates as given below.

At first, the clock K signal 230 generated by the CPU 29, which is the base of the timing of the entire apparatus body, and the horizontally and vertically synchronized signals 40 are supplied to the timing generator (TG) 218 at the display timing of the photographing device 108.

The timing generator 218 generates the timing signals at which to form images on the photographing device 213. In synchronism with the clock K signal 230 and the horizontally and vertically synchronized signals 40 from the CPU 29, the timing generator supplies the timing signal 226 (which is the basic timing signal for the image formation) to the photographing device 213; the timing signal 227 (which needs the voltage conversion given to the photographing device 213) to the vertical driver 217; the sample bold signal 231 (which is the timing signal of the sample holding) to the CDS/AGC circuit 214; and the sample clock 228 (which is the basic clock at which to sample the image signals) to the A/D converter 215 and the image processor 216, respectively.

At this time, the lens 108 converges light on the photographing plane (charged surface) of the photographing device 213 by refracting light from the object (which is not shown) to be photographed.

The photographing device 213 is formed by a CCD, for example, and the size of the image formed by the photographing device 213 is 1,280 horizontal pixels (dots) and 960 vertical pixels.

Then, the photographing device 213 converts the light from the object on the lens 108 into electric signals (charges) in accordance with the timing signal 226 from the timing generator 218, and supplies the electric signals thus converted to the CDS/AGC circuit 214 as analogue image signals 222.

Also, the vertical driver (V-Driver) 217 converts the voltage amplitude of the signal that drives the photographing device 213 in accordance with the timing signals 227 from the timing generator 218.

In this way, the electric signals having the 1,280 horizontal pixels and 960 vertical pixels are supplied to the CDS/AGC circuit 214 as signals of the photographed image.

In accordance with the sample hold signals 231 from the timing generator 218, the CDS/AGC circuit 214 performs the sampling process and removes noises from the photographed image signals 222 from the photo-graphing device 108. Also, the gain of the signal amplitude is automatically controlled, Then, the CDS/AGC circuit 214 supplies the photographed image signals 223 thus processed to the A/D converter 215.

The A/D converter 215 converts the photographed image signals (analog pixel signals) from the CDS/AGC circuit 214 into the 10-bit digital data 64 in accordance with the sample clock 228 from the timing generator 218, and supplies the digital data 224 to the image processor 216 via the 10-data bus.

The image processor (signal processing circuit) 216 is an image processing IC. Then, the control signals 221 from the CPU 29 are given to the image processor 216 through the camera microcomputer 211. Therefore, the image processor 216 executes the image processes, such as the white balancing, the AE, and more by reading from or writing to the inner registers (not shown) in accordance with the control signals 221.

More specifically, the image processor 216 performs the correction process, such as the white balancing, for the digital data from the A/D converter 215 in accordance with the sample clock 228 from the timing generator 218. Then, the image processor converts such data from the color space available at the photographing device 213 to the color space of the RGB system, and then, causes the image data 39 in the YUV 8-bit format to be supplied to the CPU 29 through the 8-data bus.

(2) Sub-CPU Unit 202

As shown in FIG. 5, the sub-CPU unit 202 is provided with the sub-CPU 1 which communities with the main CPU unit 201, the PHS unit 203, and the camera unit 204 described above. With the sub-CPU 1, there are connected the black and white LCD display 104, the dog dial 11, the keyboard 103, the mode dial 101, the shutter button 102, the RTC 4, the DC-DC converter 24, and the battery 22.

The sub-CPU unit 202 thus arranged has the functions given below.

(2-1)

The sub-CPU 1 exchanges the commands and data by communicating with the CPU 29 of the main CPU unit 201.

As means for this communication, the parallel transfer is performed by use of the bus 19 formed by 13 signals lines. The bus 19 comprises an 8-data bus, a one-address signal line, an I/O READ line, an I/O WRITE line, a chip selection line, and an INTERRUPT signal line.

Also, the sub-CPU 1 supplies the reset request signal Reset of the main CPU unit 201 to the CPU 29 through the signal line 20.

Further, the sub-CPU 1 supplies the rest request signal Rest of the camera unit 204 control to the camera microcomputer 51 through the signal line 21.

(2-2)

The sub-CPU 1 communicates with the PHS module 48 of the PHS unit 203 to exchange commands, data, and some more between them.

As this communication means, the serial transfer is performed using the signal line 16 for serial data carrier signals (TxD and RxD), the signal line 17 for RING signals, and the signal line 18 for WakeUp signals.

Also, the sub-CPU 1 supplies the rest request signal Reset to the PHS module 48 of the PHS unit 203 through the signal line 18.

(2-3)

The sub-CPU 1 controls the display operation of the black and white LCD 104 by serially transferring the commands, data, and the like through the signal line 3 for use of the CS signal, RS signal, SDA signal, and SCL signal in order to allow the black and white LCD 104 to display telephone numbers and others.

Also, the sub-CPU 1 controls the ON/OFF of the back light (not shown) of the black and white LCD 104 by supplying the BL-ON signal to the black and white LCD 104 through the signal line 3.

(2-4)

The sub-CPU 1 is connected with the RTC 4 through the 12C-BUS (Inter IC BUS: advocated by Philips Inc.).

The RTC 4 generates calendar, time, and other information. Also, the RTC 4 operates with the operation clock of 32.768 kHz, and this operation clock is supplied to the PHS module 48 through the signal line 49.

It is arranged for the sub-CPU 1 to obtain the information of data, time, and some others by use of the RTC 4.

Also, the alarm signal is transmitted from the RTC 4 to the interruption terminal IRQ of the sub-CPU 1 through the signal line 6. In this way, the sub-CPU 1 is ready to operate interruption process at the time set in advance.

(2-5)

The sub-CPU 1 detects an input made by the key operation of the mode dial 101, the shutter button 102, the keyboard 103, or the like.

In other words, the sub-CPU 1 is arranged to be able to discriminate four modes: by detecting the current operational status of the mode dial 101 (mode change switch), the sub-CPU discriminates the OFF mode (the source-supply cut off mode), the TEL mode (the telephone mode), the VIEW mode (the reproduction mode), and the CAMERA mode (the camera mode) from one another. To this end, the sub-CPU 1 is connected with the mode dial 101 by four signal lines (switch input terminals) 8.

Also, the sub-CPU 1 detects the operational status of the shutter button 102 (the shutter switch). The shutter button 102 is a two-staged switch which enables the button to be in the state of being half depressed and completely depressed, respectively. Therefore, the sub-CPU 1 is arranged to determine whether the shutter button 102 is half depressed or completely depressed. To this end, the sub-CPU 1 and the shutter button 102 are connected by two signal lines (switch input terminals) 10.

Also, the sub-CPU 1 detects the operational status of the jog dial 11.

The jog dial 11 is used for selecting the target item of a plurality of items indicated on the screen of the black and white LCD 104. For example, the user rotates the jog dial 11 to move the cursor on the screen of the black and white LCD 104. When the cursor is positioned on the target item, the item is determined by depressing the jog dial 11. Also, the jog dial 11 is composed so as to be capable of being switched over on the screen of the black and white LCD 104. For example, if the jog dial is inclined to the left, the screen returns to the previous indication. If it is inclined to the right, the screen is allowed to proceed to the next indication.

Such operational control accompanied by the operation of the jog dial 11 is performed by the sub-CPU 1 with its detection of the current operational status of the jog dial 11. Therefore, the sub-CPU 1 is connected with the jog dial 11 by a total of five lines (switch input terminals) 12, that is, two signal lines for use of discriminating two rotational directions; one signal line for use of discriminating the depression of the jog dial; and two signal lines for use of discriminating the left and right inclinations thereof.

Also, the sub-CPU 1 detects the operational status of the keyboard 103.

The keyboard 103 is used for inputting the telephone numbers. It is formed by switches of 8×2 key matrix type.

Therefore, the keyboard 103 is scanned by the sub-CPU 1 by use of the eight output signal lines (output terminals) 14 and two input signal lines (input terminals) 15.

Each of the keys, such as the mode dial 101, the shutter button 102, and the keys of the keyboard 103, among some others, is provided with a special input terminal which is used for interruption when any of the inputs should change. Therefore, when the sub-CPU 1 is on standby without any particular fob to be executed, the sub-CPU 1 is allowed to shift from the standby status to the full-on status automatically if the key input changes, and then, execute the control processes to be made following such changes of input.

(2-6)

The sub-CPU 1 is connected with the battery 22 through the signal line 26. Then, by the signal line 26, serial communications are carried out by use of the RxD. For example, the sub-CPU 1 receives the remaining amount of the cell energy from the battery 22 or information on the battery when it has been charged (voltage, temperature, and some more), and performs the control processes in accordance with the information thus received.

Here, the electric power of the battery 22 is given to each section of the sub-CPU unit 202 through the DC-DC converter 24. Then, the sub-CPU 1 conducts the power management by controlling the ON/OFF state of the DC-DC converter 24 through the signal line (output terminal) 25.

Also, the battery 22 is provided with the attachment/detachment detection switch 23 which is interlocked with the knob (not shown) of the lid of the outlet opening for the battery 22. The detection signals of the attachment/ detachment detection switch 23 is supplied to the sub-CPU 1 through the communication line 27. The sub-CPU 1 is arranged to sense the status where the battery 22 is about to be withdrawn by the detection signal emitted from the attachment/detachment detection switch 23, and to carry out the power-off process at that time. In this way, it is arranged to prevent data and other contents of the memory from being destroyed.

Further, the output voltage of the battery 22 is supplied to the sub-CPU 1 through the signal line (A/D converter input terminal) 28. Then, the sub-CPU 1 monitors the voltage of the battery 22. If any excessive charging, excessive discharging, or any other abnormal condition is detected, the corresponding protection processes are effectuated accordingly.

(3) PHS Unit 203

Figure 7:
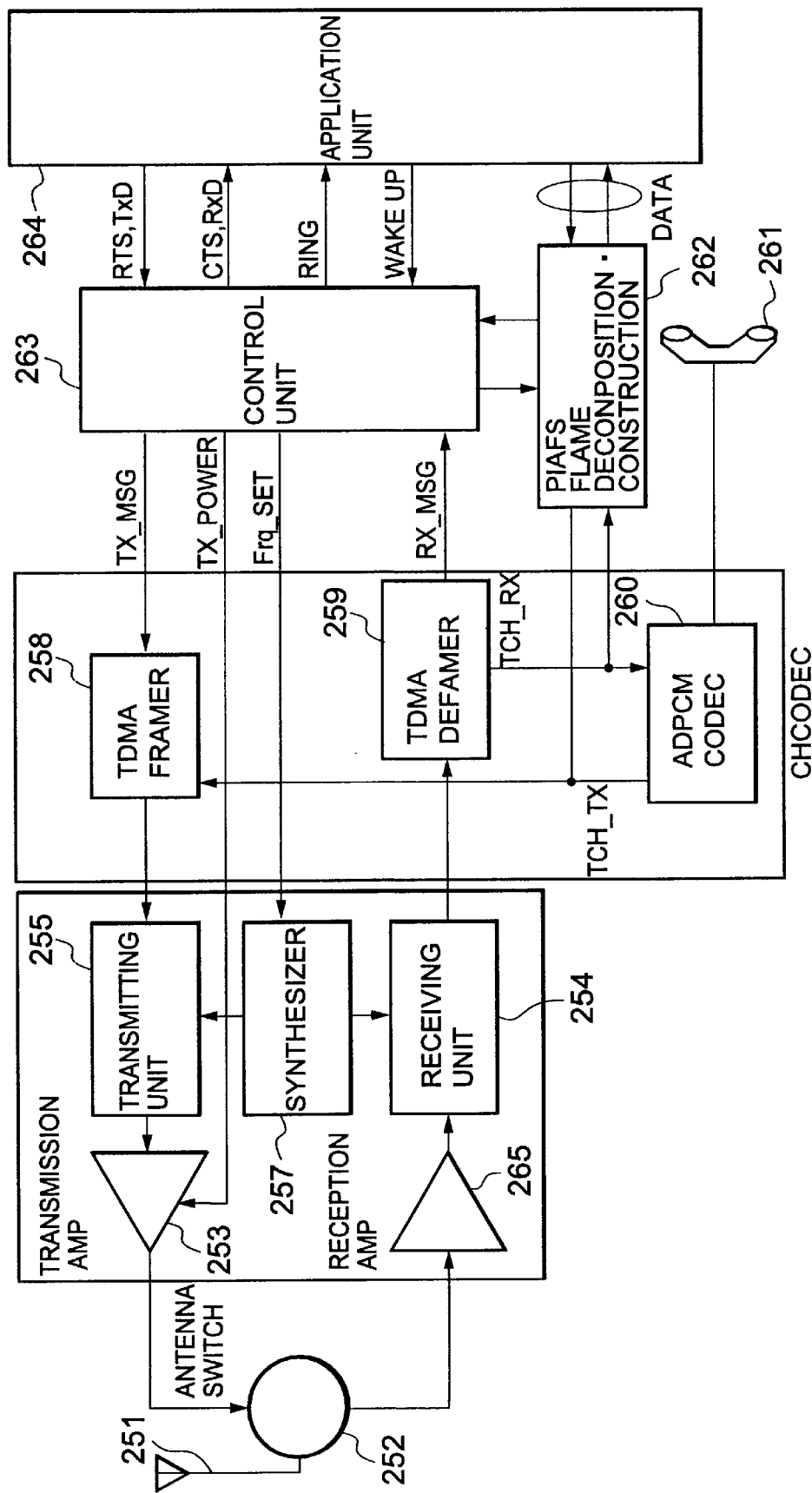
FIG. 7 is a block diagram which shows the details of the PHS unit of the digital camera represented in FIG. 1.

FIG. 7 shows specifically the inner structure of the PHS unit 203, for example.

In other words, as shown in FIG. 7, the PHS Unit 203 comprises the antenna switch 252 which connected with the antenna 251; the reception amplifier (AMP) 265 to which is supplied the output of the antenna switch 252; the synthesizer 257; the reception circuit 254 to which are supplied the outputs of the reception amplifier 265 and the synthesizer 257; the ADPCM codes circuit 260, the PIAFS frame disassemble/assemble circuit 262, and the control circuit 263, to which the output of the TDMA deframer circuit 259 is supplied, respectively; and the application unit (hereinafter referred to as application) 264 which is connected with the control circuit 263. The PIAFS frame disassemble/assemble circuit 262 is connected with the control circuit 263, and also, with the application 264. The synthesizer 257 is arranged so that the output of the control circuit 263 is supplied to it. Also, the speaker and receiver set 261 is connected with the ADPCM codes circuit 260.

Also, the PHS unit 203 comprises the TDMA framer circuit 258 to which is supplied each of the outputs of the control circuit 263 and the ADPCM codes circuit 260; the transmission circuit 255 to which is supplied each of the outputs of the synthesizer 257 and the TDMA framer circuit 258; and the transmission amplifier 253 to which is supplied each of the outputs of the control circuit 263 and the transmission circuit 255. The output of the transmission amplifier 253 is sent out from the antenna 251 by way of the antenna switch 252.

With the PHS unit 203 as described above, the operation is performed to switch, at first, the antenna switch 252 so that the transmission path that sends out data from the antenna 251 is switched over to the reception path that receives data from the antenna 251, and vice versa.

The control circuit 263 makes the control of each of the functional blocks (each of the circuits), and at the same time, accepts the requests from the application 264, and also, notifies each status to the application 264.

The application 264 is formed by the application of each of the functions that perform the corresponding service. For example, the application operates in response to the operation of the sub-CPU 1 of the sub-CPU unit 202, the CPU 29 of the main CPU unit 201, and each of the softwares (each of the programs to be described later). Then, to the PHS unit 203, the sub-CPU 1 gives each command and data related to the operation of the PHS unit. The communications carried out by the PHS unit 203 are controlled by the CPU 29.

Now, when transmission is made, the antenna switch 252 is, at first, switched over to the reception path.

Then, in accordance the control of the control circuit 263, the PIAFS frame disassemble/assemble circuit 262 processes the assembling process for the data provided by the application 264 for transmission on the basis of the PHS data communication regulation (PIAFS standard). After that, the PIAFS frame disassemble/assemble circuit 262 supplies the transmission data thus assembled to the TDMA framer circuit 258.

At this juncture, the message information TX_MSG is also supplied from the control circuit 263 to the TDMA framer circuit 258.

Also, the ADPCM codec circuit 260 digitizes the audio data inputted from the speaker and receiver set 261, and supplies it to the TDMA framer circuit 258.

Therefore, the TDMA framer circuit 258 assembles on the communication framer (TDMA frame) the message information TX_MSG from the control circuit 263 and the data TCH_TX from the PIAFS frame disassemble/assemble circuit 262 and the ADPCM codec circuit 260, and supplies the assembled data to the transmission circuit 255.

Here, the control circuit 263 transmits to the synthesizer 257 the standard signal of a certain frequency to designate a carrier. In this way, the synthesizer 257 designates the carrier of the transmission circuit 255.

With the carrier thus designated by the synthesizer 257, the transmission circuit 255 modulates the data from the TDMA framer circuit 258, and supplies them to the transmission amplifier 253.

The transmission amplifier 253 amplifies the data from the transmission circuit 255 in accordance with the control (TX_POWER) of the control circuit 263, and transmits them from the antenna 251 through the antenna switch 252.

At the reception, on the other hand, the antenna switch 252 switches over the current path to the reception path at first.

Then, the data are received from the antenna 251 and amplified by the reception amplifier 265. After that, the data thus amplified are supplied to the reception circuit 254.

At this puncture, the control circuit 263 designates a carrier by transmitting the standard signal of a certain frequency. In this way, the synthesizer 257 designates the carrier for the reception circuit 254.

With the carrier thus designated by the synthesizer 257, the reception circuit 254 demodulates the reception data from the reception amplifier 265, and supplies them to the TDMA deframer circuit 259.

The TDMA deframer circuit 259 disassembles the reception data (data frame) from the reception circuit 254 into the message information RX_MSG to the control circuit 263, and the information data on communication TCH_RX, such as audio and PIAFS data, and then, supplies the message information RX_MSG to the control circuit 263, and the information data on communication TCH_RX to the ADPCM codec circuit 260 and to the PIAFS frame disassemble/assemble circuit 262, respectively.

The ADPCM codec circuit 260 converts the audio data contained in the information data on communication TCH_RX from the TDMA deframer circuit 259 into analog data, and outputs them to the speaker and receiver set 261 as voices.

In accordance with the control of the control circuit 263, the PIAFS frame disassemble/assemble circuit 262 performs the disassembling process of the information data on communication TCH_RX from the TDMA deframer circuit 259 on the basis of the PHS communication regulation (PIAFS standard). Then, the PIAFS frame disassemble/assemble circuit 262 supplies the data obtained by such disassembling to the application 264.

The control circuit 263 supplies the message information RX_MSG from the TDMA deframer circuit 259 to the application 264.

The application 264 performs the respective processes for the data from the PIAFS frame disassemble/assemble circuit 262 and the control circuit 263.

(4) Main CPU Unit 201

As shown in FIG. 5, the main CPU unit 201 comprises the aforesaid CPU 29; the EDODRAM 30 which is connected with the CPU 29; the flash ROM 31 and ROM 32; and the IrDALED 36 with which the IrDA module 35 and IrDA module 35 are connected.

Also, the main CPU unit 201 is provided with the crystal oscillators 46 and 47 installed for the CPU 29.

For the main CPU unit 201 thus arranged, the CPU 29 (the CPU chip) is at first provided, with three serial ports (SerialPorts 0 to 2).

The signal line 38 of the serial port SerialPort 0 is used for communication with the camera unit 204. Therefore, the CPU 29 issues instructions to the camera regarding the exposure condition, the use of stroboscope, the photographing modes and timing, and others through this signal line 38.

The signal line 37 of the serial port SerialPort 1 performs the IrDA communication with the external host computer (not shown). Here, the IrDA module 35 converts the serial data provided through the signal line 37 into the data for use of IrDA, and then, performs the infrared commuunication of the data obtained by the IrDA module for use of the IrDA by means of the IrDALED 36 (driver/receiver).

The signal line 34 of the serial port SerialPort 2 is used for communication with the wireless communication unit (not shown). To the wireless communication unit, commands are issued from the sub-CPU 1 of the sub-CPU unit 202, while the communication data are provided by the CPU 29 through the signal line 34.

Therefore, it becomes possible to collect instructions and information to the wireless communication unit without interrupting the transmission while the wireless communication is being made. This communication is usable to obtain the information of the field intensity, for example.

Also, the CPU 29 is provided with the parallel interface 19, and the sub-CPU unit 202 and the main CPU unit 201 are connected by use of this parallel interface 19.

Further, the CPU 29 executes image capturing; interpolation and thinning processing of image signals; display outputs to the black and white LCD 104 and the color LCD 107; communications with the camera microcomputer 211 of the camera unit 204, and with the sub-CPU 202, as well as with the aforesaid wireless communication unit; communications with the external host computer; protocol processes usually used for the Internet, such as TCP/IP; and the user's applications such as electronic mails or WWW.

Therefore, the CPU 29 comprises the interface 39 and display interface 41 of the camera unit 204, besides, although not shown, it comprises serial ports, memory interface, parallel interface, general purpose I/O (hereinafter referred to as GPIO), arithmetic unit, cache storage, DMA controller, timer, and compression and expansion engines, among some others.

In this respect, the interface 39 of the camera 204 and the display interface 41 will be described later in detail.

It is also made possible to call interruption with respect to the interface of the camera unit 204, the display interface, the timer, and DMA controller, the GPIO, the serial interface, the parallel interface, and the compression and expansion engines when each of the respective operations should be changed or some other event should take place.

For the DMA channel, it is arranged to be able to perform the data transfer as soon as data are ready without any intervention of the arithmetic unit, because the interface of the camera unit 204, the display interface, the serial interface, and the compression and expansion engines are allocated to this channel.

The EDODRAM 30 is used as the working area of the OS and the application software. Here, the EDODRAM 30 is formed by two EDODRAMs each having 16M (1×16) bit at 3.3V.

Here, the EDODRAM 30 supports the self refresh mode, and it is arranged to be shiftable to the low power dissipation status by the control of the memory controller (not shown) of the CPU 29.

The flash ROM 31 is the NOR type memory, for example, which is connected in the same mode as the usual SRAM when serving as a hardware interface.

The flash ROM 31 is used for storing images obtained by the photography performed in the camera unit 204, and for recording received electronic mails, data obtained by the ftp communications, audio data from the speaker and receiver set 261 (microphone) of the PHS unit 203, and various data such as parameters.

Then, writing to the flash ROM 31 is made in accordance with the protocol of the software program to be executed on the CPU 29.

The ROM 32 is formed by the 16M-bit mask ROM, for example, and stores the OS and the programs of the application software themselves.

This ROM 32 is selected when the power-supply is turned on for the CPU 29 or after the release of resetting. Then, the bootstrap code is selected.

The crystal oscillators 46 and 47 generate the frequency to be used in the CPU 29.

The crystal oscillator 46 generates the frequency to be used when the entire system is controlled and the NTSC is coded. On the other hand, the oscillator 47 generates the frequency to be used when data are obtained from the camera 204 (for data input).

These crystal oscillators 46 and 47 are structured so as to suspend its oscillations in the circumstance of the low power consumption.

The interface 39 of the camera unit 204 is used when the image data transferred from the camera unit 204 are stored on the flash ROM 31.

Here, the image data thus transferred are the data in the format of 4:2:2 of the image signals (CCDRaw data) obtained by photography using the photographing device 213 after the image is processed in the image processor 216 as to color space conversion, image interpolation, automatic exposure adjustment, automatic white balancing, automatic focusing, and so on. As a result, there is a need for generation of a sampling frequency which is two times the usual CCDRaw data.

Here, the CPU 29 provides the horizontally synchronized signal HD and vertically synchronized signal VD for the image processor 216 and the timing generator 218 of the camera unit 204 through the signal line 40. In this way, it becomes possible to store the image data on the flash ROM at the timing in synchronism with the camera unit 204.

The display interface 41 is used for providing the output NTSC signals from the CPU 29 for the external connector 42 and the LCD controller 53 of the color LCD 107 as well.

Therefore, the LCD controller 45 supplies the NTSC signals obtained from the display interface 41 to the color LCD 43 through the voltage conversion device 44.

The foregoing are descriptions of the main CPU unit 210, the sub-CPU unit 220, the PHS unit 230, and the camera unit 240, ~ which form the principal structure of the digital camera 100.

Now, the specific description will be made of the operational control when the digital camera 100 is used for photographing.

(1) The Control of the Photographing Operation in the CAMERA Mode

Figure 8:
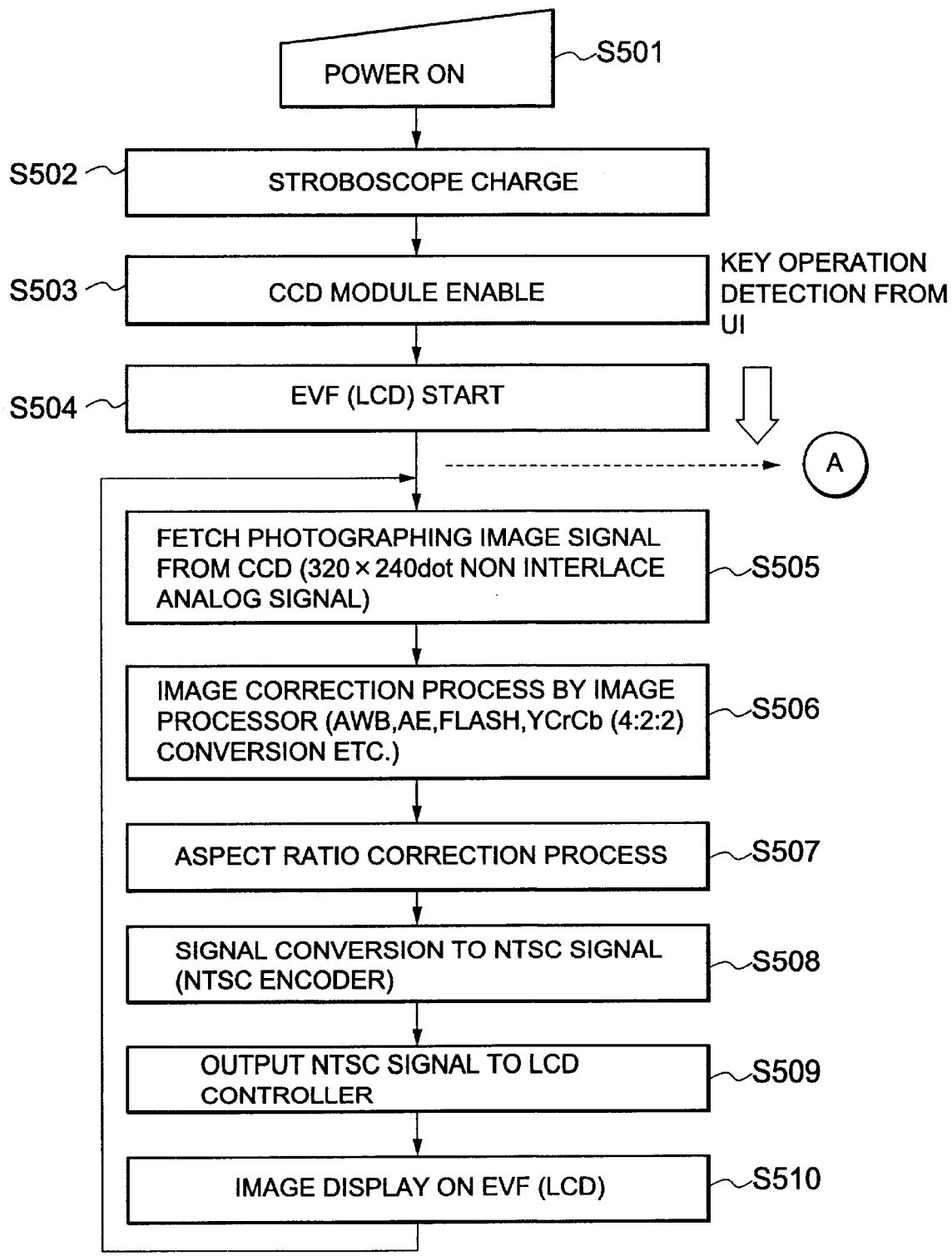
FIG. 8 is a flowchart which illustrates the program to perfom the photographing operation of the digital camera represented in FIG. 1.

On the ROM 32, a program is stored in advance in accordance with the flowchart shown in FIG. 8, for example. When this program is read by the CPU 29 for execution, the photographing operation is carried out by the digital camera 100 as given below.

In other words, when the power-supply is turned on by operating the mode dial 101 of the digital camera 100 or the CAMERA mode is switched on at first (step S501), charging begins to charge the capacitor for use in stroboscopic emission (step S502). This is because the stroboscopic emission should be ready for immediate use when the stroboscopic photographing mode is further dialed in the CAMERA mode.

Then, the operation of the camera microcomputer 211 (the CCD module that includes the controller) is enabled (step S503) to control the photographing device 213 and the like in the camera unit 204. Continuously, then, the operation begins so as to make the color LCD 107 functional as an electronic view finder (EVF) for the confirmation of an object (not shown) to be photographed (step S504).

Now, when the photographing begins, the continuous processes from the image that has been taken in the camera unit 204 up to the display thereof on the screen of the color LCD 107 are carried out in the following steps:

At first, the optical information of the object that has been taken in from the lens 108 is converted into the electric signal by use of the photographing device 213 (photoelectric conversion process) (step S505).

The output signal of the photographing device 213 is the interlace analog signal. Then, in order to make the processing speed faster, it is arranged to compress data to a size of 320×320 pixels by the application of thinning processing, not the data hang the total pixels of 1,280×960.

Subsequently, the signal obtained in the step S505 is transmitted to the image processor 216 for the execution of the image process described above (step S506). In other words, the correction processes, such as the automatic white balancing, AE, and stroboscopic photography, are executed. The image process, such as conversion to the YCrCb (4:2:2) format, is also executed in this step.

Here, the signal obtained in the step S506 (that is, the signal converted into the YCrCb format) is further processed by the application of software in order to correct the deviation in the aspect ratio resulting from the difference in the output image signal on the color LCD 107 (EVF) and the processing frequency (step S507).

Then, the signal processed in the step S506 and step S507 is converted into an NTSC signal by use of an NTSC encoder (not shown) (step S508). The signal thus processed is supplied to the LCD controller 45 of the color LCD 107 (step S509).

Consequently, the image of the object observed by the EVF is indicated on the screen of the color LCD 107 by the signal output of the LCD controller 45 (step S510).

Each of the processing steps S505 to step S510 as described above is executed as a continuous loop at a cycle of 1/30 second. Thus, the objective image is always monitored on the screen of the color LCD 107.

Now, during the monitoring period on the color LCD 107, if the photographer operates any one of the keys, an interruption event takes place following the detection signal thereof. Then, the process shifts to the interruption process A.

(1-1) Interruption Process A

Figure 9:
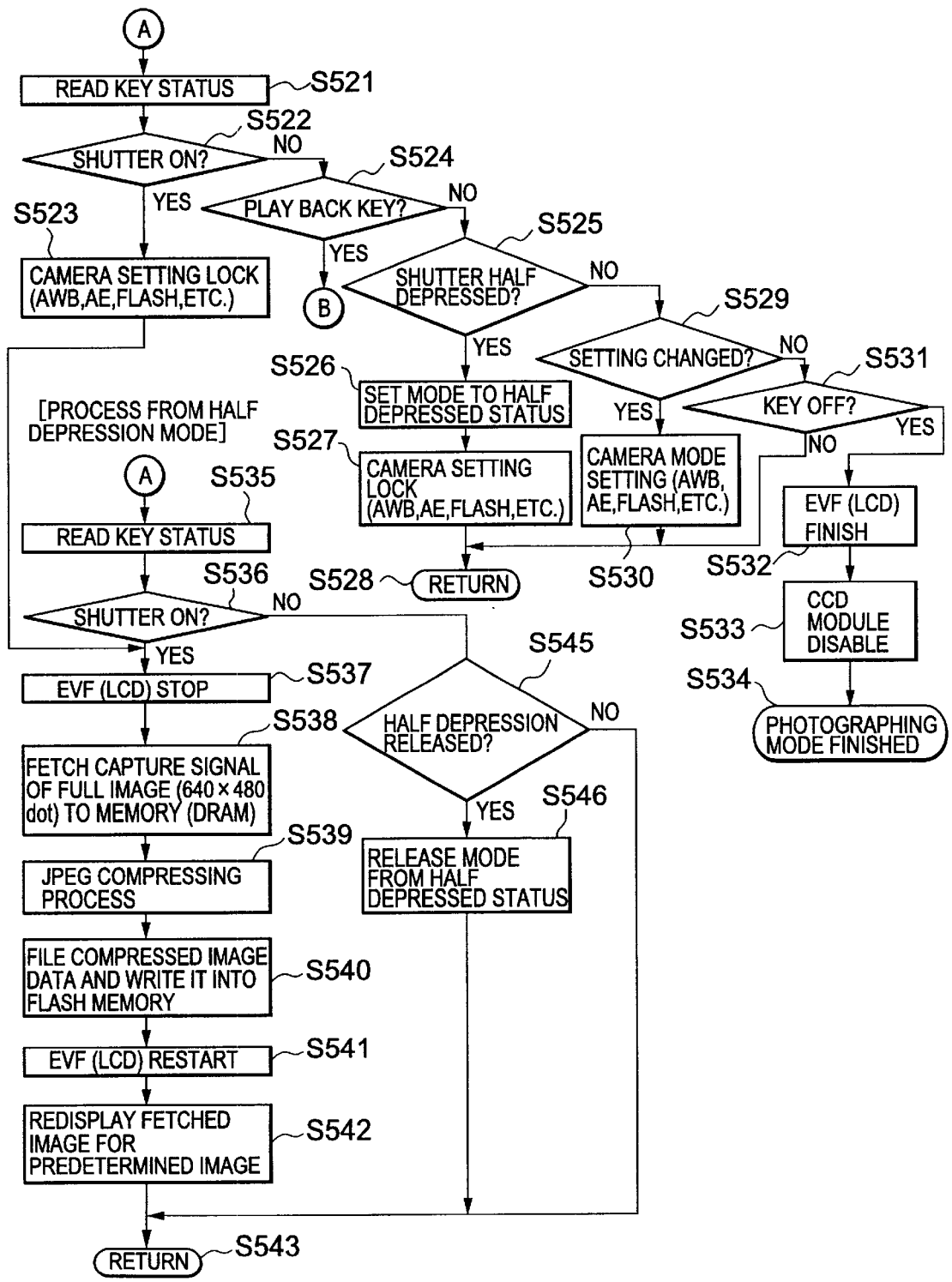
FIG. 9 is a flowchart which illustrates the program to execute the interruptive process by use of the corresponding keys for the photographing operation represented in FIG. 8.

On the ROM 32, a program is stored in advance in accordance with the flowchart shown in FIG. 9. When this program is read by the CPU 29 for execution, the interruption process is enabled (the interruption process by the key operation) for its execution as given below.

Here, in the stage where the key operation is made, either one of the two modes is internally designated. One of them is the normal mode, which is the mode as shown in FIG. 8, wherein the monitoring operation of a photographed image is continuously performed since the power supply has been turned on. The other one is the half-depressed mode where the shutter button 102 is half depressed once to lock each of the camera settings, and then, in such status, the monitoring operation of the image takes place.

Here, now, these processes are divided into two, and a description will be given of the starting position of the processes by the one to be carried out in the normal mode, and the other to be carried out beginning with the half-depressed mode.

(1-1-1) The Interruption Process in the Normal Mode

At first, the key status is read (step S521) to detect which one of the keys is operated.

Then, in accordance with the key status fetched in to the step S521, the current setting values are locked (step S523) with respect to the various camera settings in the image processor 216, such as the automatic white balancing, AE, stroboscopic correction in case of a stroboscope 109 photography, if it is determined that the shutter switch 102 has been operated (step S522). Then, the operation of the color LCD 107 (EVF) is suspended (step S537) in order to reduce the processing load on the CPU 29.

Subsequently, the capture signal is fetched in for the full image of 1,280×960 pixels as the photographed image, although, as described earlier, the monitoring image process has been made only for the signal having the pixel numbers of a compressed image size for the purpose of speeding up the required processes. Then, after given image processes have been executed in the image processor 216, the data is stored in the EDODRAM 30 in the YCrCb format (step S538).

The data thus stored in the EDODRAM 30 in the step S538, the image depression process is carried out (step S539) on the basis of the JPEG regulation. The compressed data are written on the flash ROM 31 as an image file (step S540).

Then, the color LCD 107 whose operation has been suspended is restored (step S541), and the image file written on the flash ROM 31 is displayed on the screen of the color LCD 107 for a given period of time (step S542) so that the confirmation of the photographed image is made possible. Thus, the current interruption process is completed (step S543). The process returns to the loop process shown in FIG. 8 to resume the monitoring process of the image.

On the other hand, if it is determined that the playback key is operated by the key status fetched in to the step S521 (step S524), the process of the playback function will be executed as described later.

Also, if it is determined that the shutter button 102 has been half depressed by the key status fetched in to the step S521 (step S525), the inner state of setting is defined to be the half-depressed mode (step S526). Then, as in the step S523 described above, each of the camera settings in the image processor 216, such as the automatic white balancing, AE, stroboscopic correction in case of a stroboscope photography, is locked at the current setting value, respectively (step S527).

After that, the current interruption process is completed (step S528). The process will return to the loop process as shown in FIG. 8. Then, the monitoring process of the image is resumed.

Also, if it is determined that the key operation has been made to change the photographing conditions by the key status fetched in to the step S521 (step S529), the inner state of each setting in the image processor 216, such as the automatic white balancing, AE, stroboscopic correction in case of a stroboscope photography, is modified to be set again at the designated conditions (step S530). Then, the current interruption process is completed (step S528). The process will return to the loop process as shown in FIG. 8. Then, the monitoring process of the image is resumed.

Also, if it is determined that the OFF key (source-supply off) is operated by the key status fetched in to the step S421 (step S531), the operation of the color LCD 107 is terminated (step S532), and the operation of the CCD module is also terminated (step S533) one after another. Then, after the other photographing operations are terminated, the source-supply process is turned off (step S534).

On the other hand, if it is not determined in the step S531 that the OFF key (source-supply off) is operated, it is interpreted that no effective key operation has been made. The current interruption process is then terminated (step S528) without executing any processes. The process will return to the loop process as shown in FIG. 8, and the image monitoring process is resumed.

(1-1-2) The Interruption Process in the Half-Depressed Mode

At first, the key status is read in order to detect which one of the keys is operated (step S535).

If it is determined that the shutter switch 102 is operated by the key status fetched in to the step S521 (step S536), the processes beginning with the step S537 described above are executed, while each of the camera settings in the image processor 216 which has been locked (step S527) by the previous detection of the half depressed key (step S525) is still kept effective.

On the other hand, if it is determined that the half depression of the shutter switch. 102 has been released by the key status fetched in to the step S521 (step S545), the inner status settings in the half-depressed mode are released (step S546). Then, the current interruption process is terminated (step S528). The process will return to the loop process as shown in FIG. 8, and the monitoring of the image is resumed.

Also, if it is not determined that the half depression of the shutter switch 102 has been released by the key status fetched in to the step S521 (step S545), it is interpreted that no effective key operation has been made. The current interruption process is then terminated (step S528) without executing any processes. The process will again return to the loop process as shown in FIG. 8, and the image monitoring process is resumed.

(1-2) The Process of the Playback Function B

The process of the Playback function B is executed when it is determined in the key operation determination process (step S524) in FIG. 9 that the key is operated to activate the playback.

Here, the playback function is to make it possible to effectuate action upon an image immediately it has been photographed, such as the provision of audio information or the like (the function of audio addition), the transfer of image information by use of the electronic mail (the mail transfer function), the deletion of images (the image delete function), among others, by means of simple key operations without changing modes.

Figure 10:
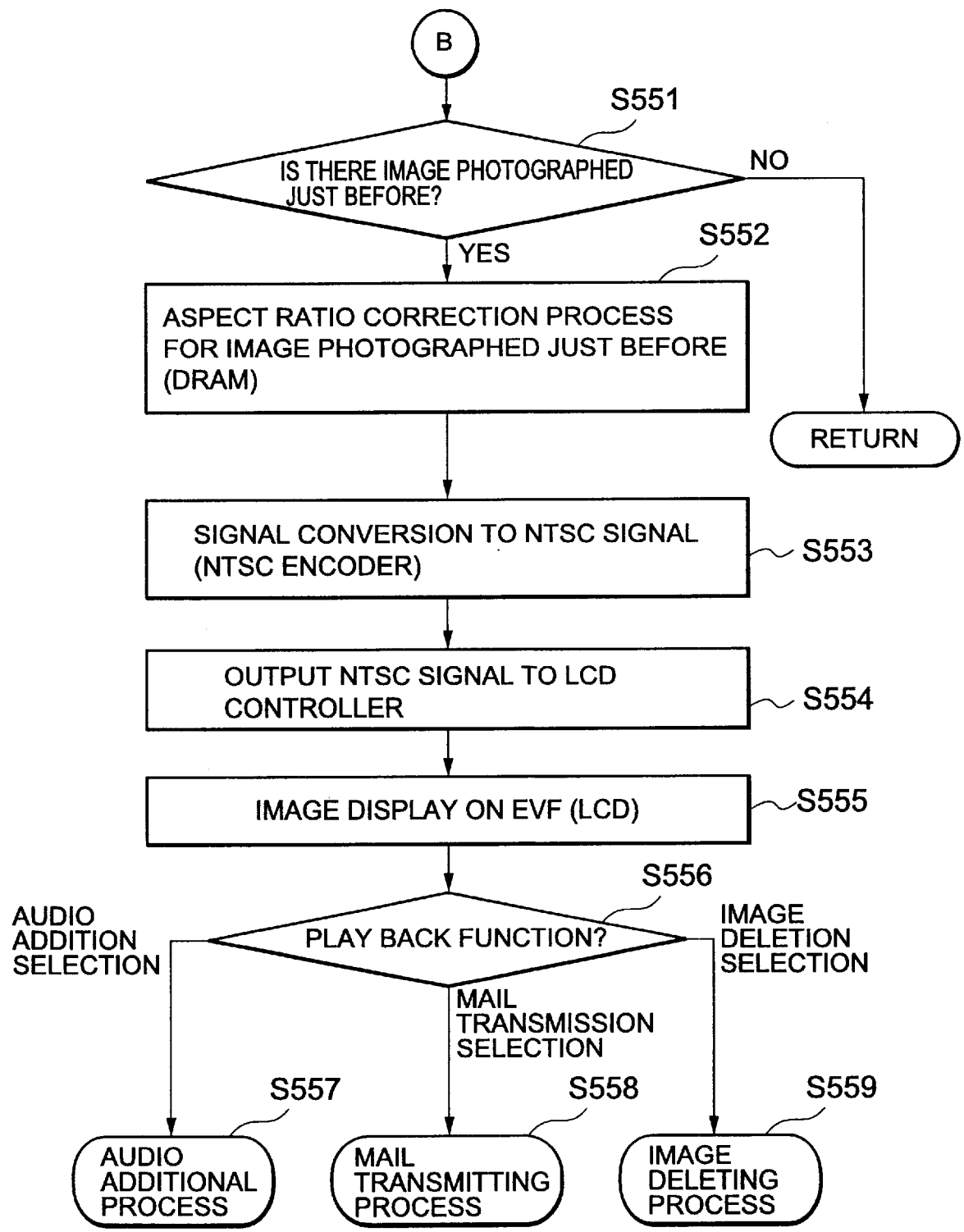
FIG. 10 is a flowchart which illustrates the program to execute the playback function for the interruptive process represented in FIG. 9.

Now, therefore, the ROM 32 is provided in advance with a stored program in accordance with the flowchart shown in FIG. 10. When this program is read by the CPU 29 for execution, the processes of the playback function will be made as given below.

At first, it is determined whether or not there is any image that has been obtained by photographing immediately before (step S551).

By "image taken immediately before" is meant a photographed image which has been kept effective since the photographing operation has been executed by use of the shutter button 102 up to the moment the mode is changed or any one of other functional operations is performed.

Then, if it is found as a result of the detection that there is no image taken immediately before, no process will be executed, and the current interruption process is terminated (S540). The process will return again to the loop process as shown in FIG. 8. The image monitoring is resumed.

On the other hand, if there is any image that has been taken inmediately before, the correction process is executed, at first, by the application of software with respect to the aspect ratio resulting from the difference in processing frequency for such image taken immediately before as has been written on the EDODRAM 30 in the same manner as the processes executed in the step S507 to the step S510 as shown in FIG. 8 (step S552).

Then, the signal processed in the step S552 is converted into the NTSC signal (step S553) by use of the NTSC encoder (not shown). The signal thus converted is supplied to the LCD controller 45 of the color LCD 107 (step S554).

Consequently, the object image is displayed on the screen of the color LCD 107 by means of the EVF (step S555) with the output signal of the LCD controller 45.

After that, the kind of the playback functions which have been selected by the photographer is distinguished (step S556). Then, the process is branched out to the corresponding one accordingly.

In other words, if the audio addition function is selected, the audio addition process will be executed (step S557). If the mail transfer function is selected, the mail transfer process will be executed (step S558). If the image deleting function is selected, the corresponding process will be executed to delete the photographed image (step S559).

(2) VIEW Mode (Image Display Mode)

The View mode is to reproduce (display) the image that has been obtained by photographing.

Figure 11:
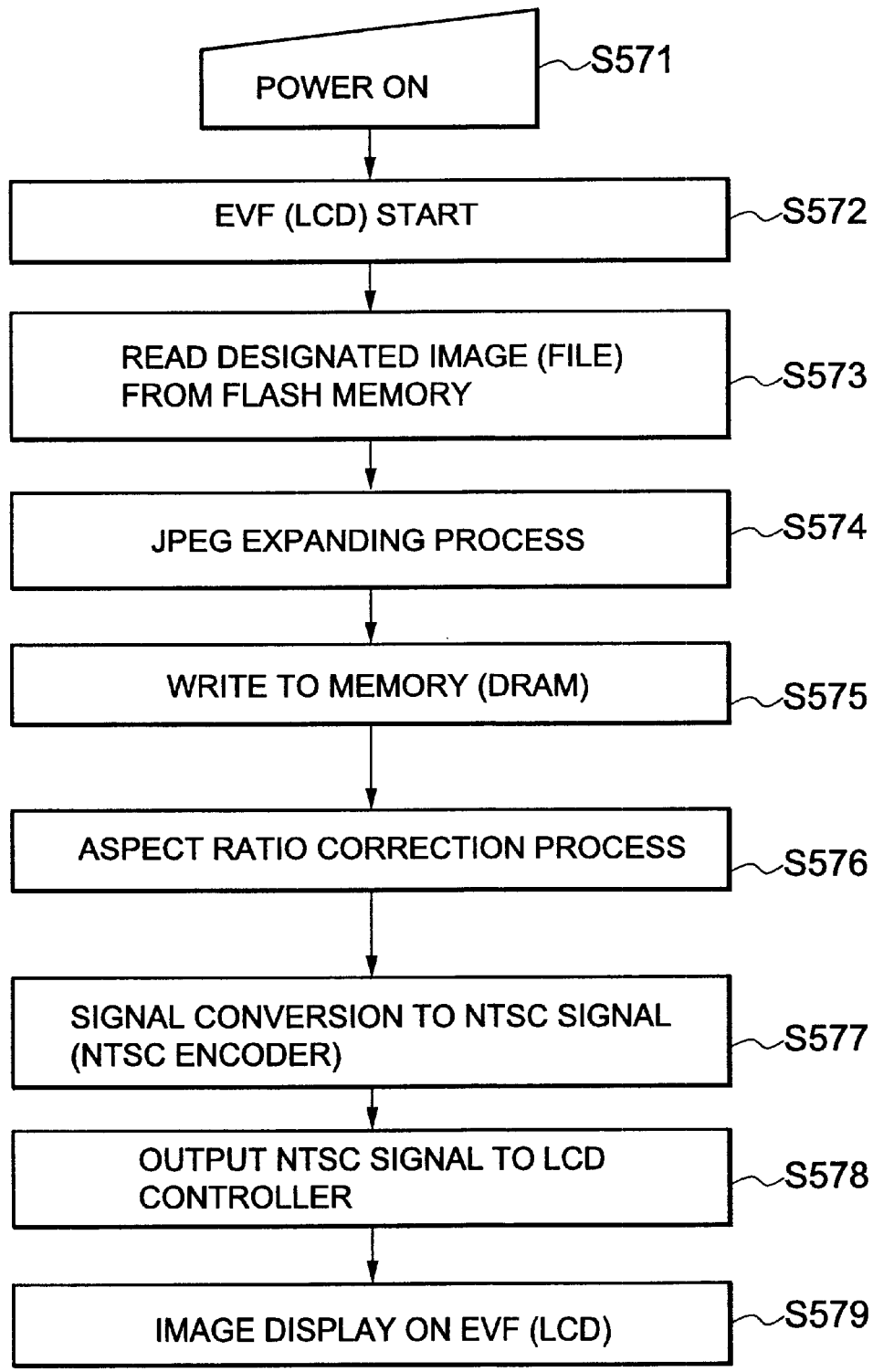
FIG. 11 is a flowchart which illustrates the program to execute the operation of image reproduction (indication) for the digital camera represented in FIG. 1.

Here, therefore, a program is stored on the ROM 32 in accordance with the flowchart shown in FIG. 11. When the program is read by the CPU 29 for execution, the operation of the VIEW mode of the digital camera 100 will be carried out as given below.

At first, the source-supply is turned on by the operation of the mode dial 101 of the digital camera 100 or the VIEW mode is dialed to be switched (step S571), the operation of the color LCD 107 begins (step S572) so that the color LCD 107 operates as the electronic view finder (EVF) for the confirmation of an object when it is photographed.

Now, as shown in FIG. 9, the compressed image file, which has been written on the flash ROM 31 by the writing process of the photographed image (step S540) is read (step S573). Then the decompression process, that is, the process to convert the compressed data on the basis of the JPEG standard into the original data (the data in the YCrCb format), is executed (step S574).

After that, the original data thus obtained by decompression in the step S574 is written on the EDODRAM 3 (step S575).

Thereafter, in the same manner as the processes in the step S507 to the step S510 shown in FIG. 8, the correction process and others will be executed (step S576) by the application of software as to the deviation of the aspect ratio resulting from the difference in the processing frequency for the original data (image data) written on the EDODRAM 30. Then, by use of the NTSC encoder (not shown), the data is converted into an NTSC signal (step S577), and supplied to the LCD controller 45 of the color LCD 107 (step S578).

Therefore, on the color LCD 107, the selected image by the designation of the EVF is displayed on its screen by use of the output signal of the LCD controller 45 (step S579).

Figure 12:
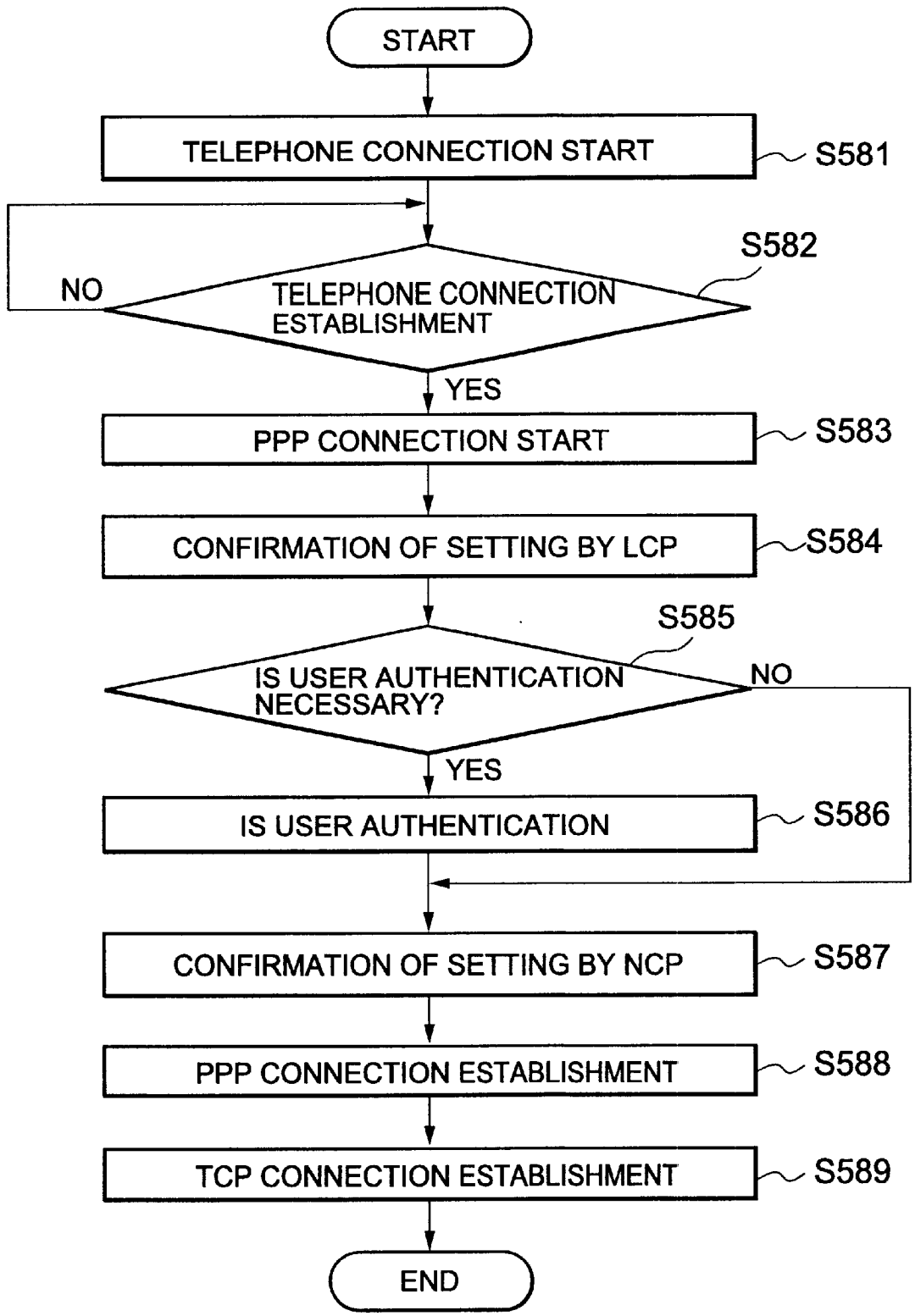
FIG. 12 is a flowchart which illustrates the program to execute a link establishment process of an electronic mail for the digital camera represented in FIG. 1.
Figure 13:
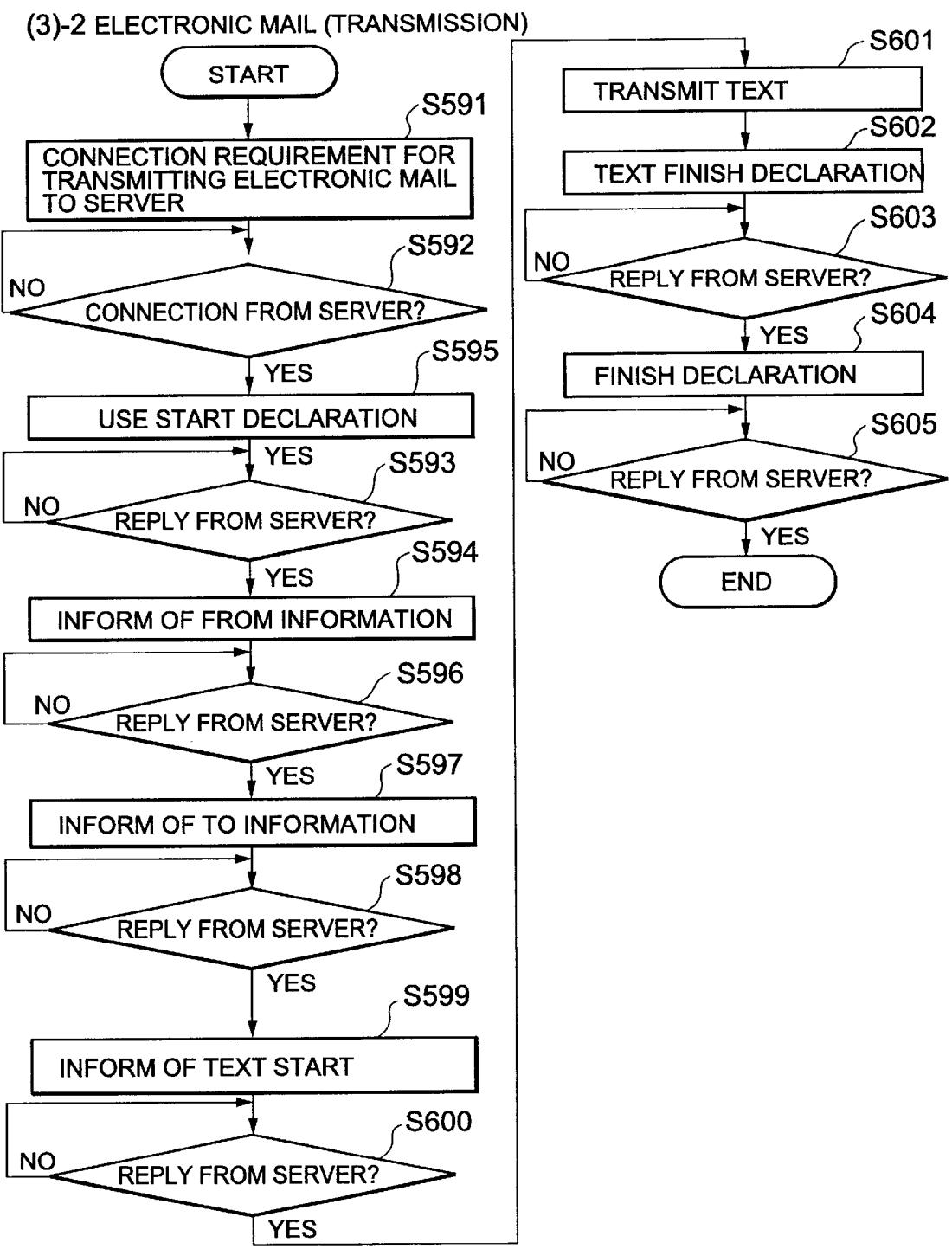
FIG. 13 is a flowchart which illustrates the program to execute the transmission and reception processes for the electronic mail represented in FIG. 12.
Figure 14:
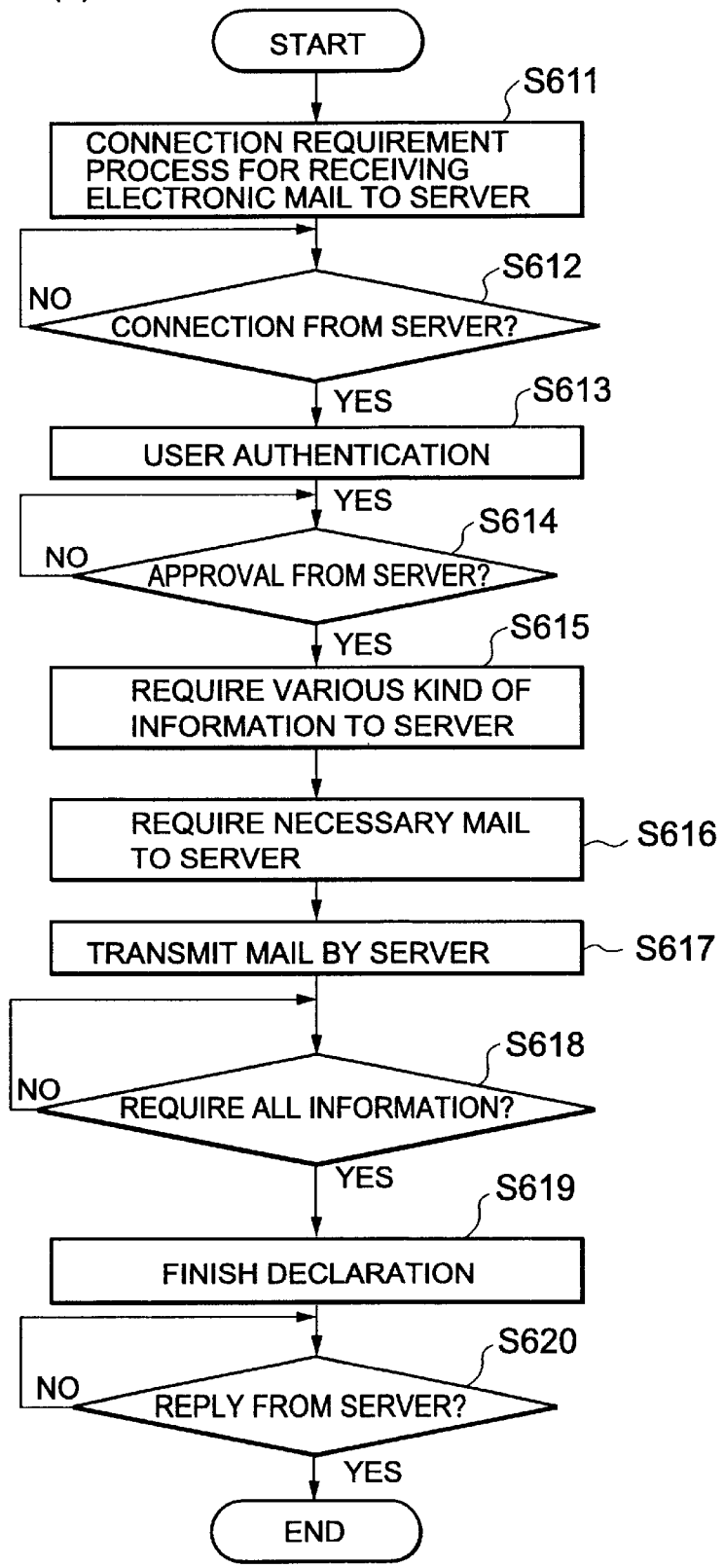
FIG. 14 is a flowchart which illustrates the program to execute the transmission and reception processes for the electronic mail represented in FIG. 12.

(3) The Operational Control of the Electronic Mail at the Time of Transmission and Reception A program is stored on the ROM 32 in accordance with the flowchart shown in FIG. 12 to FIG. 14, for example. When the program is read by the CPU 29 for execution, the transmitting and receiving operation of the electronic mail will be carried out for the digital camera 100 as given below.

(3-1) The Link Establishment

Here, for example, it is assumed that the TCP/IP link establishment is made by the PPP (point to point protocol) using the telephone line.

In other words, as shown in FIG. 12, the connecting process for the telephone line begins, at first, by means of the AT command (step S581).

Then, it is determined whether or not the connection of the telephone line has been established (step S582), and if connected, the TCP/IP connection process begins by the PPP (step S583).

Subsequently, by the LCP (link control protocol), the link establishment process is executed for the data link layer (step S584).

Then, it is determined whether or not the user approval is needed (step S585). If needed, the protocol of the user approval will be executed (step S586).

If the user approval is not needed, the setting by the NCP (network control protocol) is confirmed (step S587). This confirmation should also be made after the execution of the user approval protocol when the user approval is needed.

Then, the connection by the PPP is established (step S588), and also, the connection by the LCP is established (step S589). After that the current process is terminated.

(3-2) The Transmission of Electronic Mail

If, for example, an electronic mail should be transmitted by the SMTP (simple mail transfer protocol), the SMTP client (hereinafter, simply referred to as a client) issues, at first, the request of connection to the SMTP server (hereinafter, simply referred to as a server).for the transmission and reception of an electronic mail (step S591).

When the server is connected by this request, the server returns to the client a response code indicating "connection OK".

When the client recognizes the reception of this response code (step S592), it declares to the server the commencement of use by notifying the server of the client's domain name by means of the HELD command (step S593).

Then, the server returns to the client the response code indicating "normal", together with the domain name of the server when the server recognizes the domain name of the client.

When the client recognizes the reception of this response code and the domain name of the server (step S594), the client notifies the server of the From information by means of the MAIL command and declares the commencement of electronic mail transmission (step S595) by designating the user name (address) at the source of transmission.

Then, the server returns to the client the response code indicating "normal" when the server recognizes that the user name (address) at the source of transmission is correct, and that the reception of this mail is ready by the reception of the "from" information from the client and the user name at the source of transmission.

When the client recognizes the reception of this response code (step S596), the client designates the address of the mail for the server (step S597) by, means of the RCPT command.

Here, if the mail is to be sent to a plurality of parties, the plural mail addresses are designated in the step S597 accordingly.

Then, the server determines whether or not the mail address designated by the client is acceptable, and returns to the client the response code indicating "normal" if the client can handle the address thus designated, and, otherwise, returns the code indicating that the mail will be transferred to another SMTP server.

When the client recognizes the reception of the normal response code (step S598), the client declares to the server the text transmission of the mail by means of the DATA command (step S599).

If the reception is ready, the server returns to the client the response code indicating "the admission of the mail transmission" (the response code 354) when the server receives from the client the declaration of the text transmission of the client's mail.

When the client recognizes the reception of this response code (step S600), the client transmits to the server the text of the mail (step S601). Then the client transmits the node indicated by <CR> <LF> <CR> <LF>, and the like to declare completion of the text transmission (step S602). Here, in accordance with the present embodiment, it may be possible for the client to attach an image file, which is the file of one or more photographed inages, for example, or a file of received images, to the text of the mail.

Then, the server returns to the client the response code indicating that the server has completely complied with the client's request normally (the response code 250), when the server receives the client's declaration of the termination of the text transmission.

When the client recognizes the reception of this response code (step S603), the client declares to the server the termination of the transmission of the SMTP electronic mail (step S604).

Then, the server returns to the client the response code indicating "termination" when the server receives the client's declaration of the termination.

When the client recognizes the reception of this response code (step S605), the TCP connection is cut off, to terminate the current process.

(3-3) The Reception of Electronic Mail

When an electronic mail is received by the POP 3 (Post Office Protocol version 3), for example, the POP client (hereinafter, simply referred to as a client) issues, at first, a request to the POP server (hereinafter, simply referred to as a "server") for connection to receive the electronic mail, as shown in FIG. 14 (step S611).

Then the server returns to the client the response code indicating "connection OK" together with the name of the server.

Recognizing the reception of this response code and the name of the server (step S612), the client transmits to the server the name of the user and pass-word for the server's identification by means of the USER command and the PASS command (step S613).

Then, when able to confirm the user's name and pass word from the client, the server returns to the client the response code indicating "normal".

Recognizing the reception of this response code (step S614), the client requests the server the information of the mail box (step S615) by means of the STAT command (the command whereby to request the information of reception status of the mail box, such as numbers of mail), and the LIST command (the command whereby to request the list information of mails currently kept in the mail box) as required (step S615).

Then, the server transmits to the client the mail box information to comply with the request.

On the basis of the information received from the server, the client requests of the server the transmission of the required mails (step S616) and, the server transmits to the client the required mails (step S617).

With the reception of mails from the server, the client examines whether or not it has requested of the server all the mails the client needs (step S618). If it is found that there are still some more mails to be requested, then the client returns to the process in the step S615, and repeats the processes thereafter.

If all the requested mails have been received from the server as needed, the client requests of the server the execution of updating the mail box, and then, declares termination of reception of the electronic mail by the POP 3 (step S619).

Then, the server returns to the client the response code indicating "termination" in accordance with the client's declaration of the termination.

When the client recognizes the reception of this response code (step S620), the connection of the POP 3 is cut off, and the current process is terminated.

Figure 15:
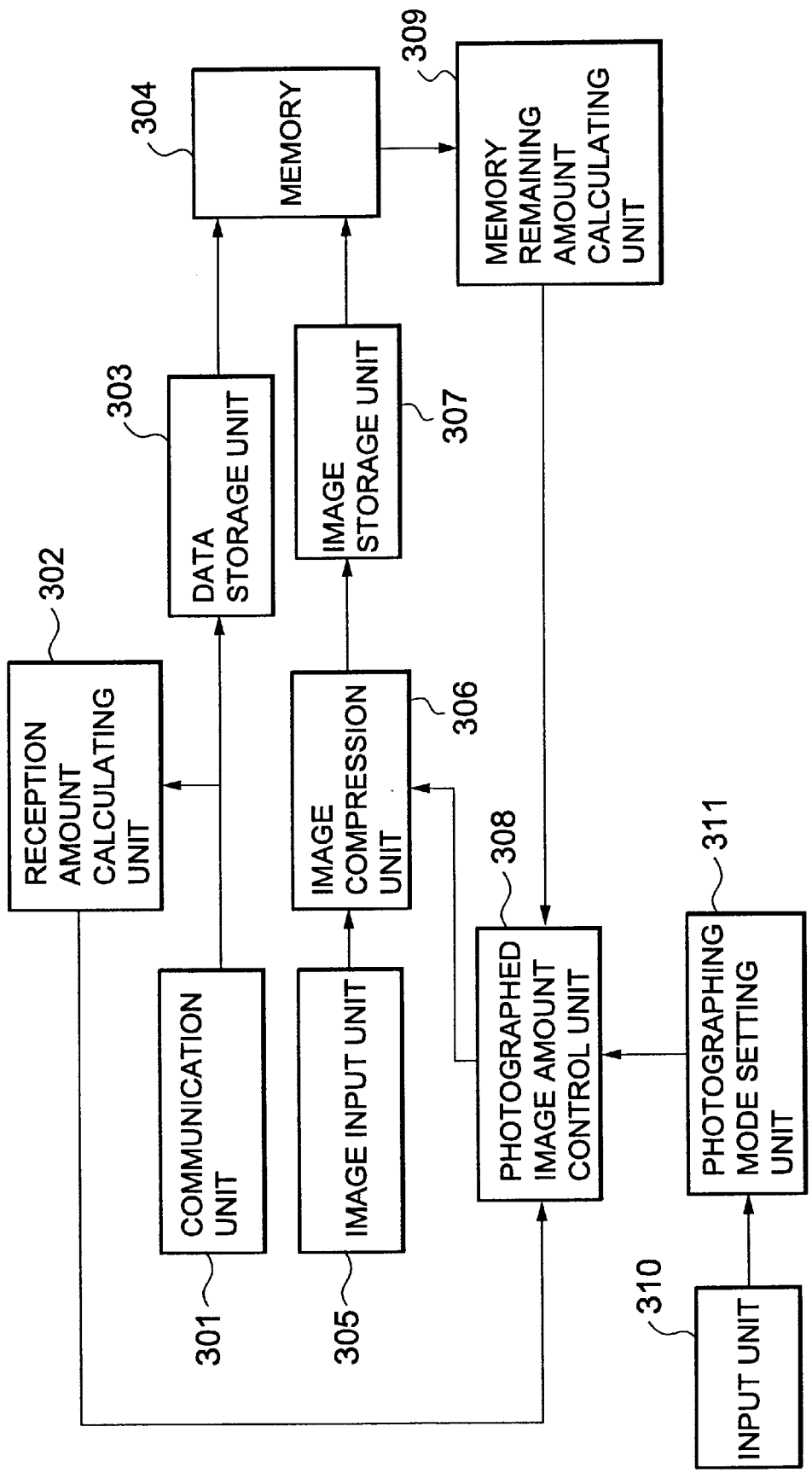
FIG. 15 is a block diagram which conceptually shows the control flow of the digital camera represented in FIG. 1.

FIG. 15 is the conceptual block diagram which shows the control flow for the digital camera 100 structured to perform various operations with the various function provided as described above, for example.

In other words, the digital camera 100 comprises a communication unit 301; the reception amount arithmetic unit 302 and the data storage 303 to which the output of the communication unit 301 is supplied, respectively; the memory 304 to which, is supplied the output from the data storage 303; an image input unit 305; the image compression unit 306 to which is supplied the output from the image input unit 305; and the image storage unit 307 to which is supplied the output from the image compression unit 306. It is also arranged that the output of the image storage unit 307 is supplied to the memory 304.

The digital camera 100 further comprises the memory remainder arithmetic unit 309 to which is supplied the output from the memory 304; an input unit 310; the photographing mode setting unit 311 to which is supplied the output from the input unit 310; and the photographed image amount control unit 308 to which is supplied each of the outputs from the memory remainder arithmetic unit 309 and the photographing mode setting unit 311. It is also arranged that the output of the photographed image amount control unit 308 is supplied to the image compression unit 306.

Now, the communication unit 301 is the unit that corresponds to the PHS unit 203.

The reception amount arithmetic unit 302 is implemented by the application of software to be executed by the CPU 29 of the main CPU unit 201. The reception amount arithmetic unit 302 works out the data amount (the estimated amount of reception data) of the data expected to be received by the communication unit 301 using the communication protocol.

The data storage 303 stores the data received by the communication unit 301 on the memory 304 by use of the filing system.

The memory 304 corresponds to the flash ROM 32 (non-volatile memory) of the main CPU 201.

The image input unit 305 corresponds to the entire body of the camera unit 204 which is structured as shown in FIG. 6.

The image compression unit 306 is incorporated in the CPU 29, which is able to adjust the image size after compression by changing the designations as to the quantization table.

The image storage unit 307 stores the image data compressed by the image compression unit 306 on the memory 304 by the operation of the CPU 29.

The photographed image amount control unit 308 is implemented by the application of software used by the CPU 29.

More specifically, the compression control is carried out by changing the parameters of the quantization table or the like in the image compression unit 306. In other words, if it is determined that the remainders of the memory 304 are small by the indication of the memory remainder arithmetic unit 309, which will be described later, the image compression unit 306 is informed accordingly so that the image compression unit 306 may be 4ble to change the compression ratios.

The memory remainder arithmetic unit 309 is implemented by the application of software used by the CPU 29, and when the remainders of the memory 304 are calculated, this unit uses the file system table arranged on the memory 304.

The input unit 310 corresponds to the mode dial 101. In other words, this unit is used when the photographer designates the photographing mode or the like.

The photographing mode setting unit 311 sets the photographing mode by notifying the current status of the mode dial 101 (input unit 310) to the CPU 29 by use of the sub-CPU 1 of the sub-CPU unit 202.

Here, the Table 1 shows one example of the photographing mode in which the modification is given to the aforesaid image compression unit 306 by means 308 for controlling the photographed image amount, and the typical image sizes, as well as the numbers of the quantization table used at that time.

TABLE 1

| PHOTO-GRAPHING MODE | SUPER-FINE | FINE | NORMAL | ECONOMY |
|---|---|---|---|---|
| Typical Size | 200 KB | 100 KB | 50 KB | 25 KB |
| QUANTIZING TABLE | 1 | 2 | 3 | 4 |

Here, it is assumed that the photographing mode is classified into four stages: superfine mode, fine mode, normal mode, and economy mode, and that the image size after compression is classified into four stages: 400 KB, 200 KB, 100 KB, and 50 KB.

Now, hereinbelow, description will be made of the processes executed by the application of software for controlling the photographed image amount.

Figure 16:
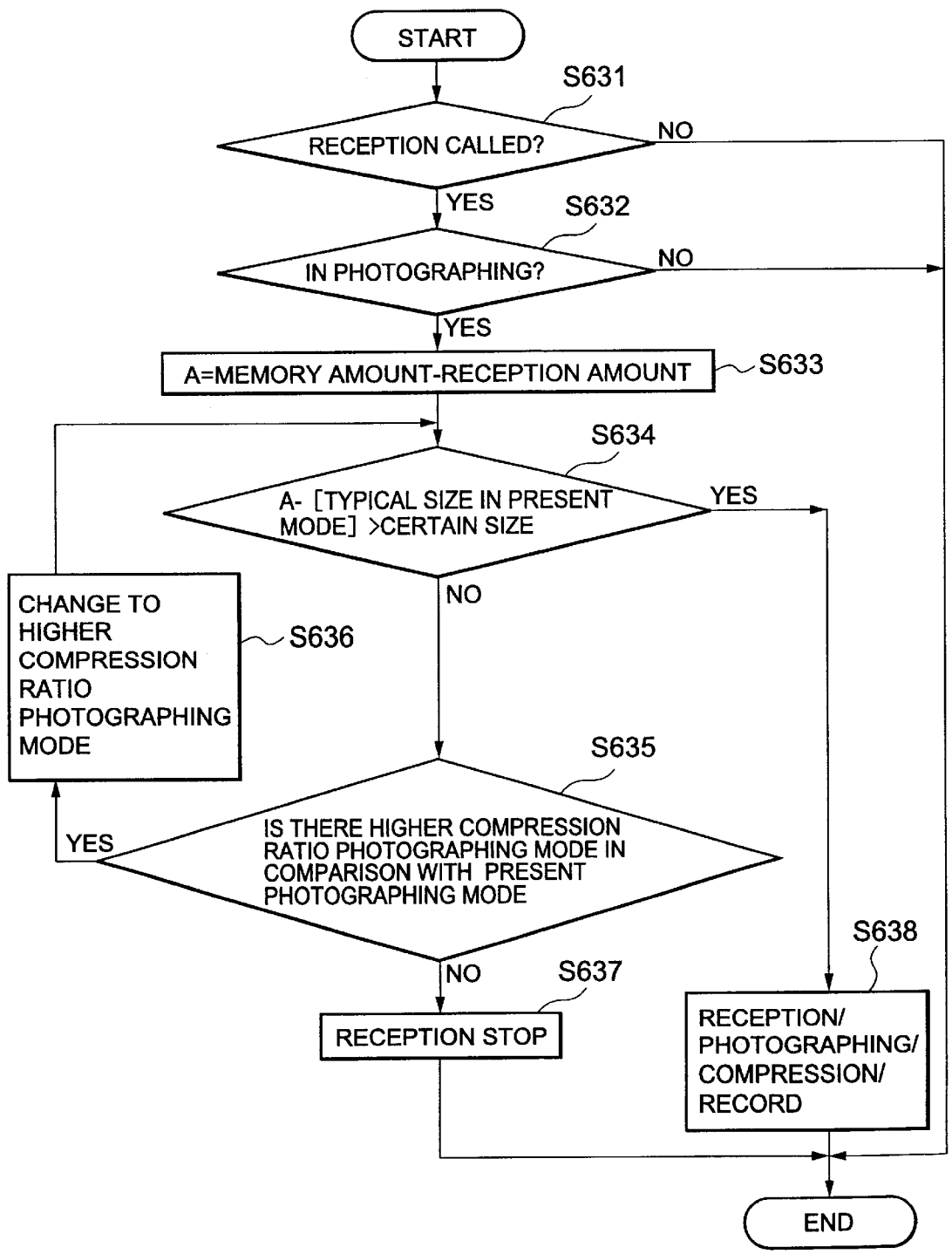
FIG. 16 is a flowchart which illustrates the program to execute the control of the amount of a photographing image for the digital camera represented in FIG. 1.

On the ROM 32 of the main CPU unit 201, a program is stored in advance in accordance with the flowchart shown in FIG. 16, for example. When this program is read by the CPU 29 for execution, the amount of the photographed image is controlled for the digital camera 100 as given below.

At first, the communication unit 301 (PHS unit 203) determines whether or not the current status is the reception called (step S631), and also, whether or not the image input unit 305 (camera unit 204) is in the photographing status (step S632).

As a result of this determination, if the status is the reception called in the photographing mode, the following steps will be executed. If not, the current process will be terminated.

Here, the determination of whether or not the status is in the photographing mode is made by the detection of the current status of the shutter button 102: whether it has been half depressed or totally depressed or by the detection of the CAMERA mode by means of the mode dial 101.

Then, if the reception call is ready in the photographing status, the photographed image amount control unit 308 obtains the value A (step S633) which is the value obtainable by subtracting the estimated amount of reception data calculated by the reception amount arithmetic unit 302 from the remainders of the memory 304 calculated by the memory remainder arithmetic unit 309.

Here, the estimated amount of reception data is worked out on the basis of the estimated amount of data on the received Email, for example. In other words, by use of the POP 3 described above as the communication protocol, the calculation is made by means of the POP 3 LIST command and STAT command in the "various information requests to the server" in step S615 of the program shown in FIG. 14.

Now, the photographed image amount control unit 308 obtains from the aforesaid Table 1 the typical image size after compression corresponding to the current photographing mode set by the photographing mode setting unit 311. The image size thus obtained is subtracted from the value A that has been obtained in step S633. After that, it is determined whether or not the resultant value exceeds a specific value (step S634).

Here, the reason why the value of the specific amount is used as offset is that the compression of the JPEG type or the like makes it difficult to estimate the image size after compression in advance, but to estimate only the typical image size after compression. Therefore, with the value of a specific amount which is set large enough, it becomes possible to secure a specific number of photographed images even after the termination of communication.

If the value obtained by subtraction should exceed the value of the specific amount as the result of the determination in step S634, it means to indicate that there is still room for the remainders of the memory 304. Therefore, the reception process, the photographing process, the compression process, and the recording process will be executed continuously (step S638). Then, the current process is terminated.

If the value obtained by subtraction does not exceed the value of the specific amount as the result of the determination in step S634, it is determined by the photograph image amount control unit 308 whether or not there is any photographing mode applicable at a higher compression ratio by use of Table 1 in order to heighten the compression ratio of the image compression unit 306 (step S635).

If there is no photographing mode found that may serve the purpose as the result of the determination in step S635, the reception operation is suspended (step S637), and the current process is terminated.

Here, as to the photographing operation, it is assumed that the photographing operation is started after the remainders of the memory 304 have been detected and confirmed. Therefore, it is possible to continue the photographing operation even if there is no suitable photographing mode found applicable as the result of the determination in step S635.

If the corresponding photographing mode has been found as the result of the determination in step S635, the photographed image amount control unit 308 heightens the compression ratio of the image compression unit 306 (step S636) by directing the image compression unit 306 to the quantization table applicable to the photographing mode that may be obtained from the aforesaid Table 1.

Subsequently, the process returns to step S634, and repeats the processing steps thereafter.

(Second Embodiment)

The structure of the digital camera of the present embodiment is the same as that of the digital camera 100 in the accordance with the first embodiment described above. However, the control of the entire body is different.

In other words, as shown in FIG. 15, the communicating operation of the compunction unit 301 and the photographing operation of the image input unit 305 are overlapped. Therefore, if the remainder of the memory 304 becomes insufficient, the amount of the reception data from the communicating party is controlled (restricted) by use of the communication protocol.

Figure 17:
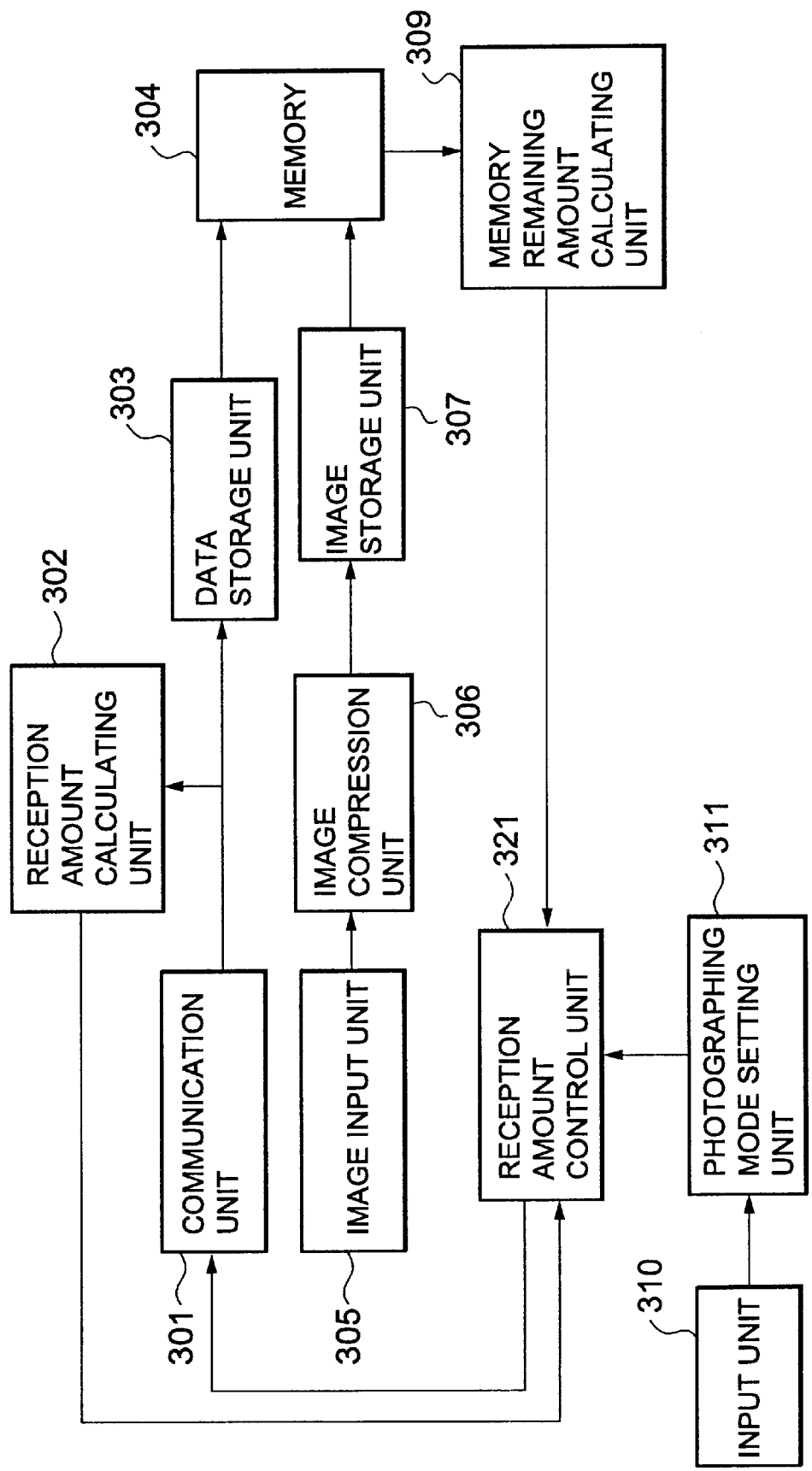
FIG. 17 is a block diagram which conceptually shows the control flow of the digital camera represented in FIG. 1 in accordance with a second embodiment of the present invention.

Consequently, the structure (the conceptual structure shown in the block diagram) of the digital camera 100 shown in FIG. 15 is modified to be the one shown in FIG. 17, for example.

As shown in FIG. 17, the reception amount control unit 321 is arranged in place of the photographed image amount control unit 308 shown in FIG. 15.

The reception amount control unit 321 is implemented by the application of software of the CPU 29 to receive each of the outputs supplied from the reception amount arithmetic unit 302 and the memory remainder arithmetic unit 309, and to output its processed data to the communication unit 301.

Also, the reception amount control unit 321 receives the information of the remainder of the memory 304 from the memory remainder arithmetic unit 309, and if it is determined that the amount of the reception data is large, this unit notifies the communication unit 301 accordingly so as to restrict the amount of reception data to be received by the communication unit 301. More specifically, using the communication protocol this unit notifies the communicating party, of its denial of the reception of data, partly or otherwise, through the communication unit 301.

Now, hereunder, the description will be made of the processes executed by the application of software to control (restrict) the amount of reception data.

Here, in this respect, the specific description will be made of the aspects which differ from those of the first embodiment.

Figure 18:
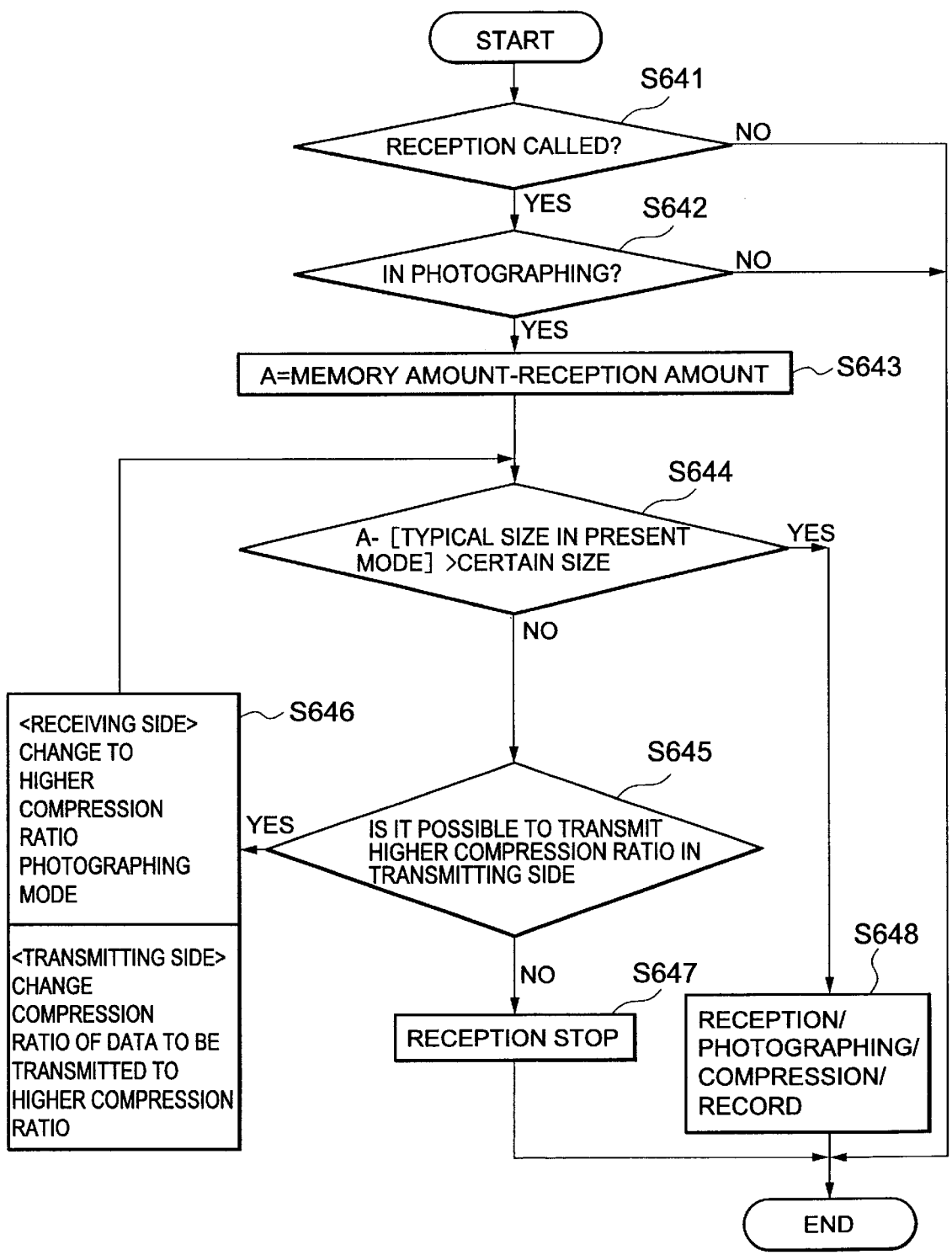
FIG. 18 is a flowchart which illustrates the program to execute control of the amount of receiving data for the digital camera in accordance with the second embodiment of the present invention.

On the ROM 32 of the main CPU unit 201, a program is stored in advance in accordance with the flowchart shown in FIG. 18, for example. When this program is read by the CPU 29 for execution, the control (restriction) of the amount of reception data is performed for the digital camera 100 as given below.

At first, in the same manner as in step S631 to step S634 shown in FIG. 16, it is determined whether or not the current status is the reception called or whether or not the current status is the photographing (step S641 and step S642). If it is found that both the reception called and the photographing are ready, the following steps will be executed for processing. If not, the current process is terminated.

In the reception, called status, and also, in the photographing status, the reception amount control unit 321 obtains the value A which is arrived at by subtracting the estimated amount of reception data calculated by the reception amount arithmetic unit 302 from the amount of the memory remainder calculated by the memory remainder arithmetic unit 309 (step S643).

Then, the reception amount control unit 321 obtains from the aforesaid Table 1 the typical image size after compression corresponding to the current photographing mode set by the photographing mode setting unit 311. The image size thus obtained is subtracted from the value A obtained in step S643 to determine whether or not the resultant value exceeds the value of a specific amount (step S644).

If it is found that the subtracted value exceeds the value of the specific amount as the result of determination in step S644, this indicates that there is still room for the remainder of the memory 304. Therefore, the reception process, the photographing process, the compression process, and the recording process are continuously executed (step S648). Then, the current process will be terminated.

Here, if it is not found that the subtracted value exceeds the value of the specific amount as the result of determination in step S644, the reception amount control unit 321 inquires to the communicating party whether or not the transmission is still possible with a higher compression ratio through the communication unit 301 (step S645).

If it is found in step S645 that the transmission with a higher compression ratio is impossible on the communicating party side, the reception operation is suspended (step S647), and then, the current process will be terminated.

As described above, it is determined, at first, whether or not the current status is the reception called or photographing (step S641 and step S642). If affirmative, the processes in step S643 et seq. are executed. If negative, the processes will be executed in step S702 et seq. as described later.

In the reception called status, and also, in the photographing status, the reception amount control unit 321 obtains the value A which is arrived at by subtracting the estimated amount of reception data calculated by the reception amount arithmetic unit 302 from the amount of the memory remainders calculated by the memory remainder arithmetic unit 309 (step S643).

Here, the estimated amount of the reception data is calculated by means of the required commands, thereby to request various information from the server. For example, the POP 3 LIST command and STAT command are used as described in the paragraphs of "(3-3) Electronic Mail Reception".

Then, the reception amount control unit 321 obtains from Table 1 the typical image size after compression corresponding to the current photographing mode set by the photographing mode setting unit 311. The image size thus obtained is subtracted from the value A obtained in step S643 to determine whether or not the resultant value exceeds the value of a specific amount (step S644).

Here, the reason why the "value of a specific amount" is used as offset is that the compression of the JPEG type or the like makes it difficult to estimate the image size after compression in advance, but to estimate only the typical image size after compression, can be done.

In this respect, if only the value of a specific amount should be set large enough, it becomes possible to secure a specific number of photographed images even after the termination of communication.

If the value obtained by subtraction should exceed the value of the specific amount as the result of the determination in the step S644, it means that there is still room for the remainder of the memory 304. Therefore, the reception process, the photographing process, the compression process, and the recording process will be executed continuously (step S648). Then, the process proceeds to step S702 shown in FIG. 19, which will be described later.

On the other hand, if it is not found as the result of the determination in step S644 that the subtracted value exceeds the value of the specific amount, this indicates that it is impossible to take a margin for the size of a specific image. Thus, the reception amount control unit 321 inquires of the communicating party whether or not the transmission is still possible with a higher compression ratio (step S645).

If it is found in the step S645 that the transmission with a higher compression ratio is impossible on the communicating party side, the reception operation is suspended (step S647).

Then, the process will proceed to step S702, which will be described later.

Here, the photographing operation will be continued for the reason described above.

If it is determined in the step S645 that the transmission with a higher compression is possible on the communicating party side, the control is made to change the compression and expansion type by the communication unit 301 (the reception side) and by the communicating party side (transmission side) as well. At this puncture, the retransmission flag (inner flag) is set in the communication unit 301 (step S646).

After that, the process will return to the step S644, and repeat the processing steps thereafter.

(Third Embodiment)

In step S702, the communication unit 301 examines if the retransmission flat is set or not.

As a result of this examination, if the retransmission flat is not set, the communication unit 301 issues to the communicating party the request of the original data retransmission. In this case, the request of the retransmission of the original data is made after promoting the user to increase the remainders of the memory or after the remainders of the memory have been increased, for example. In this way, it is possible to prevent the shortage of memory remainders when receiving the original data for the normal execution of the original data reception (step S703).

After that, the retransmission flag is reset to terminate the current process.

On the other hand, if the retransmission flag is not set in step S702, the current process will be terminated as it is.

(Fourth Embodiment)

For the second embodiment described above, it is arranged to control (restrict) the amount of the reception data by changing the compression and expansion type (see steps S645 and S646 in FIG. 18). In accordance with the present embodiment, only a part of the data (original data) that should be transmitted totally is received, and then, the remaining part will be received after a photographing is completed. In this manner, the amount of the reception data will be controlled (restricted).

Figure 20:
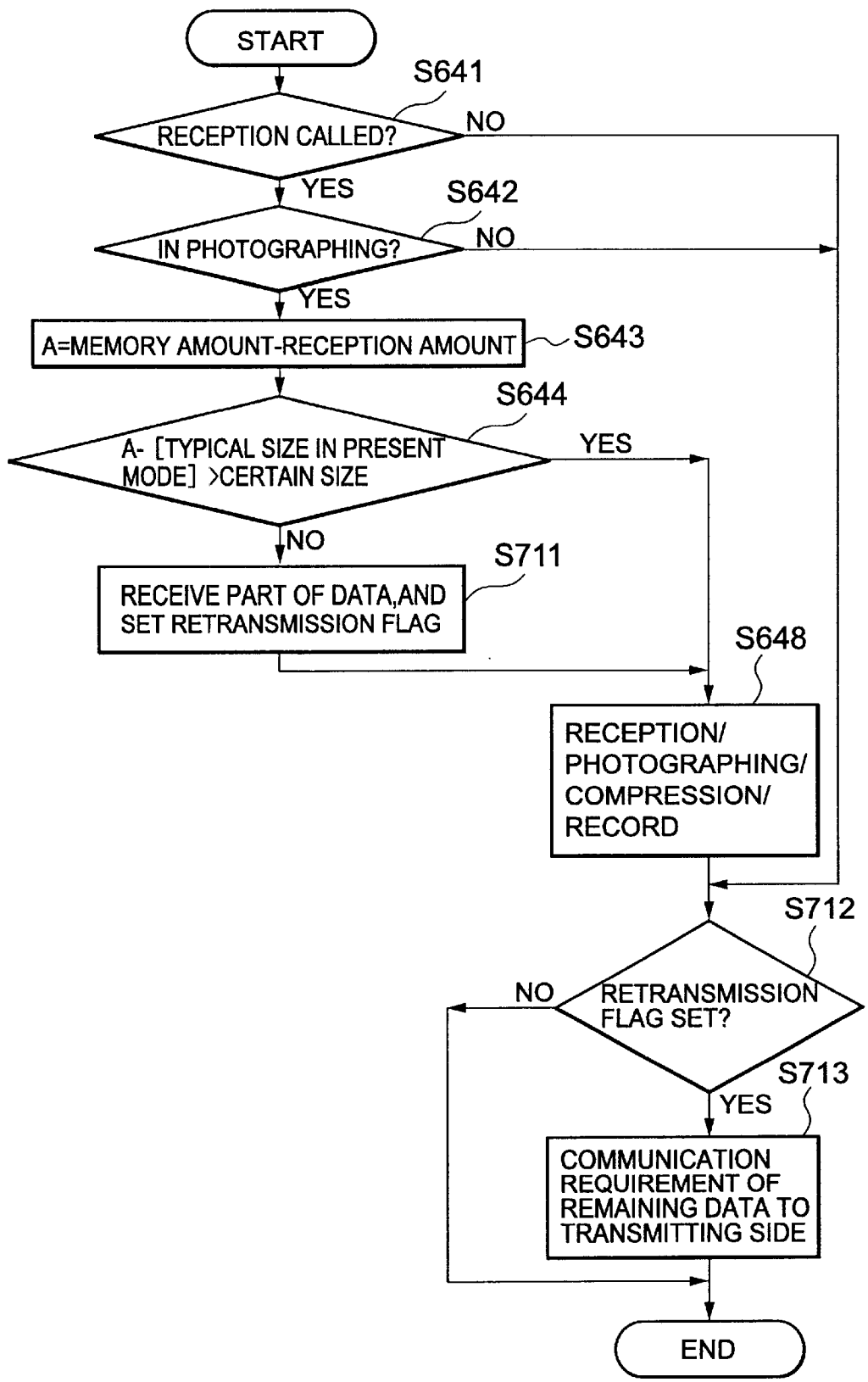
FIG. 20 is a flowchart which illustrates the program to execute control of the amount of receiving data for the digital camera represented in FIG. 1 in accordance with a fourth embodiment of the present invention.

Therefore, as the program executed by the CPU 29, a program prepared in accordance with the flowchart shown in FIG. 20 is used, for example, in place of the program shown in FIG. 18. The control is effected in accordance with the present embodiment.

Here, the same reference characters as those appearing in the flowchart shown in FIG. 18 are applied to the same processing steps of the flowchart shown in FIG. 20, and detailed description will be omitted. In this respect, specific description will be made only of the structure which differs from that of the second embodiment.

At first, it is determined whether or not the current status is the reception called or whether or not the current status is the photographing (step S641 and step S642). As a result thereof, if it is found that both the reception called and photographing status are ready, the next processing steps S643 et seq. will be executed. If not, the processing steps will be executed beginning with step S712, which will be described later.

With the status being the reception called and the photographing, the reception amount control unit 321 obtains the value A (step S643) by subtracting the estimated amount of reception data calculated by the reception data arithmetic unit 302 from the amount of memory remainder calculated by the memory remainder arithmetic unit 309 (step S643).

Then, the reception amount control unit 321 subtracts the typical image size after compression corresponding to the current photographing mode set by the photographing mode setting unit 311 from the value A obtained in the step S643, and determines whether or not the result thereof exceeds the value of a specific amount (step S644).

As a result of the determination in the step S644, if the subtracted value exceeds the value of the specific amount, this means that there is still room for the remainder of the memory 304. Therefore, the reception process, the photographing process, the compression process, and recording process will be continued (step S648).

Then, the process will proceed to the step S712, which will be described later.

On the other hand, if the subtracted value does not exceed the value of the specific amount as the result of the determination in the step S644, this means to indicate that no margin is obtainable for the specific size of an image. Therefore, the reception amount control unit 321 controls the communication unit 301 so as to receive only a part of all the data which are expected to be sent from the communicating party. For example, if it is the case of an electronic mail, only the "headings" are requested for reception. Also, in the communication unit 301, the retransmission flag (inner flag) is set (step S711).

If the structure is made in this manner so that only a part of the original data is received from the communicating party side, some more room is created in the memory remainder. Thus, the aforesaid step S648 is made executable. As a result, the reception process, the photographing process, the compression process, and the recording process will be executed continuously (step S648).

After that, the process will proceed to step S712.

In the step S712, the communication unit 301 examines if the retransmission flag has been set.

It is found as the result of this examination that the retransmission flag has been set, the communication unit 301 issues to the communicating party the request of retransmission of the remaining data. In this case, such request of retransmission is issued after having prompted the user to increase the memory remainders or after the remainders of the memory have been increased. Then, it becomes possible to prevent the incapability of securing the remainders of the memory large enough to receive the original data or the occurrence of some other related problems. In this way, the original data can be received normally at all times (step S713). After that, the retransmission flag is reset, and the current process will be terminated.

On the other hand, if it is not found that the retransmission flag is set, the current process will be terminated as it is.

(Fifth Embodiment)

Figure 19:
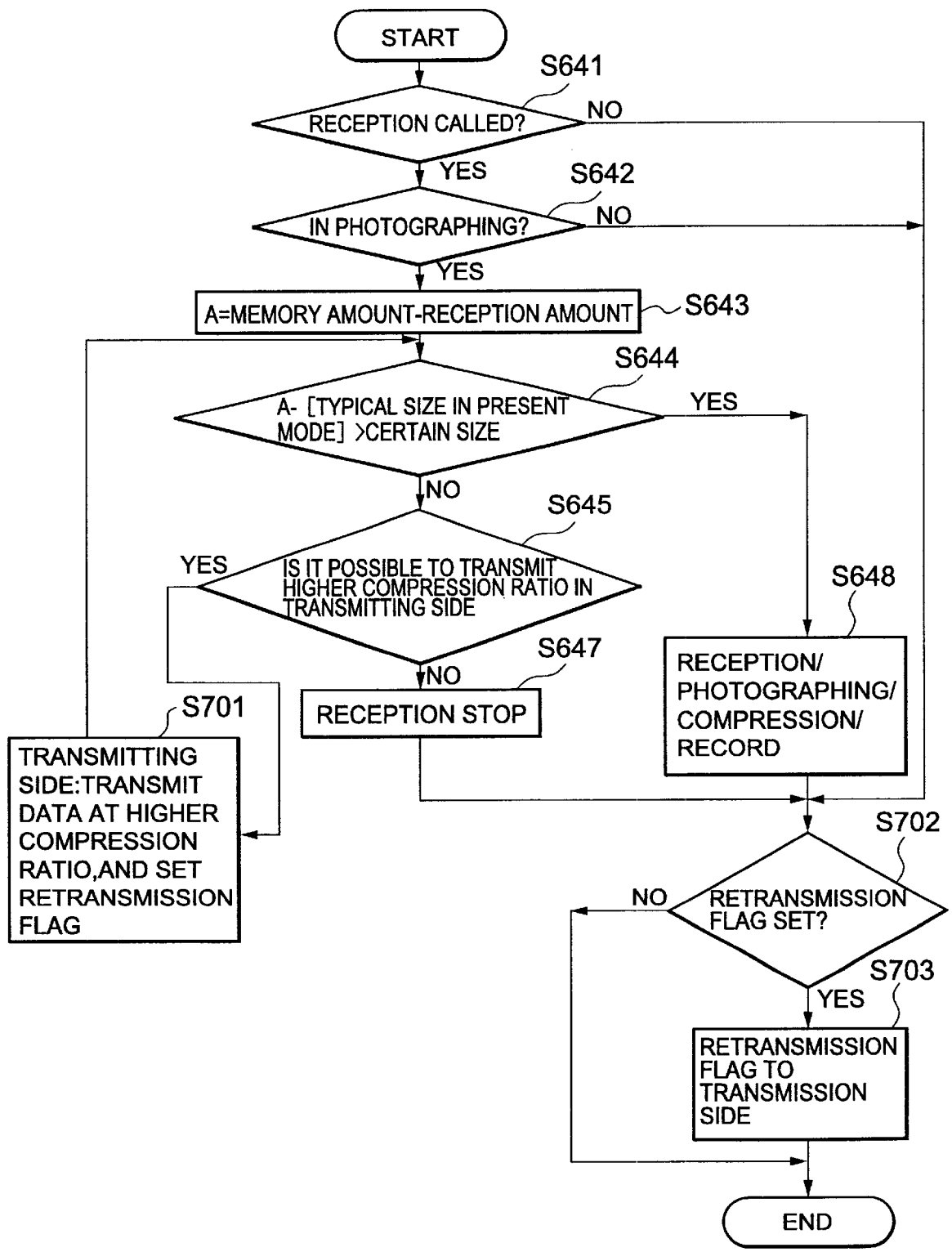
FIG. 19 is a flowchart which illustrates the program to execute control of the amount of receiving data for the digital camera represented in FIG. 1 in accordance with a third embodiment of the present invention.

In the third embodiment described above, the arrangement is made so that if it is determined that the transmission is possible at a higher compression ratio on the communicating party side (step S645), the data is transmitted with the modified compression ratio against the amount in which the data should be sent originally (step S701), and, therefore, when the connection is made again after the completion of the current photographing, the request of retransmission of the data is issued (step S703) with respect to the data which should have been sent originally before (see FIG. 19).

In accordance with the present embodiment, when the retransmisission request is issued in such a case as described above, the image data that has been photographed is transmitted to the conmunicating party, and then, the retransmission request is issued as shown in FIG. 21 (step S731)

In this way, with the transmission of the photographed data (photographed image data obtained by photographing) to the communicating party, the image data that has been in the corresponding unit can be deleted. This in return makes it possible to increase the memory remainders to that extent. Then, it becomes possible to prevent any incapability of securing the memory remainder large enough to receive the original data from the communicating party, and occurrence of some other related problems.

(Sixth Embodiment)

The digital camera of the present embodiment is structured in the same manner as the digital camera 100 described in the second embodiment. However, the control of the entire body thereof is different.

In other words, when the reception is made as to the audio, image, and other streaming data which make the estimate of reception data amount difficult, it is arranged to issue a denial of communication.

Now, hereinbelow, the description will be made of the application of software to be used for the reception of streaming data.

In this respect, only what differs from the second embodiment will be described specifically.

On the ROM 32 of the main CPU unit 201, a program is stored in advance in accordance with the flowchart shown in FIG. 22, for example. When this program is read by the CPU 29 for execution, the control is made for the digital camera 100 as to the reception of streaming data as given below.

At first, in the same manner as in the step S641 to step S643 shown in FIG. 18, it is determined whether or not the status is the reception called or whether or not the status is the photographing (step S651 and step S652). As the result of this determination, if the status is found to be the reception called and the photographing as well, the following processing steps will be executed. If not, the current process will be terminated.

Then, in the case of the reception called and photographing statuses, the reception amount control unit 321 obtains the value A by subtracting the estimated amount of reception data calculated by the reception amount arithmetic unit 302 from the remainder of memory 304 calculated by the memory remainder arithmetic unit 309 (step S653).

Now, the reception amount control unit 321 determines whether or not the estimated amount of reception data calculated by the reception amount arithmetic unit 302 is of the streaming data (step S654).

As the result of the determination in step S654, if it is found that the data is streaming data, that is, if the data expected to be received is such as recorded telephone conversations, the reception operation is suspended (step S657). Then, the current process will be terminated.

This is because if the data is streaming data, it is difficult to estimate the data amount or even to determine if an estimate is possible, and so the function whereby to restrict the amount of the reception data as described above may result in a structure which simply becomes awkward for the user to use in some eventualities.

As the result of the determination in step S654, if it is not found that the data is not streaming data, the reception amount control unit 321 obtains the typical image size after compression from Table 1 corresponding to the current photographing mode set by the photographing mode setting unit 311 as shown in FIG. 18. Then, the image size thus obtained is subtracted from the value A obtained in step S643 to determine whether or not the resultant value exceeds the value of a specific amount (step S655).

If it is found that the subtracted value exceed the value of the specific amount as the result of the determination in step S655, this means to indicate that there is still room for the remainder of memory 304. Thus, the reception process, the photographing process, the compression process, and the recording process will be performed continuously (step S658). After that, the current process will be terminated.

If it is not found as the result of the determination in step S655 that the subtracted value exceeds the value of the specific amount, the reception operation is suspended (step S657). Then, the current process will be terminated.

In this respect, it is of course possible to achieve the objectives of the present invention by supplying to a system or to an apparatus, a storage medium on which the codes of application programs are recorded to implement the host and the terminals in accordance with each of the embodiments described above so that the computer (or CPU or MPU) of such system or apparatus is arranged to be able to read such stored programming codes on the storage medium for execution.

In this case, the programming codes themselves thus read from the storage medium implement each of the functions of the respective embodiments. Therefore, it is to be understood that the storage medium on which the aforesaid programming codes constitutes an aspect of the present invention.

As the storage medium that may be able to supply the programming codes, there are ROM, floppy disc, hard disc, optical disc, magnet-optic disc, CD-ROM, CD-R, magnetic tape, non-volatile memory card, and some other that can be used.

Also, it is to be understood that the present invention includes the case as a matter of course where not only the functions of the respective embodiments described above can be implemented by the execution of programming codes read out by the computer, but also; the functions of the respective embodiments can be implemented by processes executed by the OS or others operating in the computer which perform the actual processes partly or totally in accordance with the instructions from such programming codes.

Moreover, it is to be understood that the present invention includes the case as a matter of course where the programming codes are read from the storage medium and written on the memory of an extended function board inserted into the computer or on the memory of the extended functional unit connected with the computer, and then, the CPU or the like provided for such extended function board or the extended functional unit performs the actual processes partly or totally in accordance with the instructions from the aforesaid programming codes, hence implementing the functions of the respective embodiments described above by means of such processes.

Also, as to the intervention operation of intervention means of the present invention (or the control operation of control means), the present invention is not necessarily limited to those described in the respective embodiments. For example, it may be possible to save the image data simply on the buffer memory which is arranged to delay the image input of the digital camera or the like temporarily.

Also, as to the changes of the reception data in accordance with the present invention, it may be possible to structure the arrangement so that the reception data is again compressed by the application of the data compression algorithm (ZIP method or the like used for a personal computer) for example, not necessarily limited to those described in the respective embodiments.

In accordance with the present invention described above, it becomes possible to overcome the disadvantages of such as a collision of memory resources occurring when a digital camera and a communication device are integrally formed for use with an arrangement to control the functions such as the automatic changes of compression ratio and the automatic changes of the sizes of reception data.

Consequently, it is possible to satisfy the need for communication having a high immediacy, and the photographing having a high immediacy as well at the same time. Furthermore, it becomes possible to provide a smaller apparatus or a smaller system having a higher operativity.

Also, on the photographing site, there is no possibility that the photographer misses his or her shutter change. At the same time, she or he is able to perform her or his photographing quickly and to perform a highly reliable communication with the relevant party or parties.

Moreover, since such controls as bave been described above are implemented by controlling the apparatus, the CPUs, memories, and others, the structure can be formed simply so as to perform the controls with the mission device having the usual structure, the digital camera provided with an interface for transmission use, or the like.

Also, when the data transmission is performed on the transmission side with the compression ratio which has been increased, it is possible to obtain the data that should have been sent originally if it is structured that the retransmission request may be issued after the completion of photographing.

In this case, the photographed image data (the photographed image obtained and stored in an apparatus or a system) is at first transmitted to the transmission side, and then, such controls as have been described above may be performed.

In this way, the remainders of memory is increased so that the data are received reliably from the transmission side.

With these features and advantages, the present invention should be significantly useful at present and in future, because the image input is possible with a high immediacy by the combination of communication, photographing, and some others, and at the same time, the apparatus is made smaller at low power dissipation and at lower costs of manufacture.

Now, various inventions have been shown in accordance with the embodiments described above. Here, besides the embodiments referred to in the paragraphs of the Summary of the Invention, there are still more embodiments as given below.

Item 6

For example, in accordance with the other embodiments, a method of the present invention for processing images comprises the steps of performing the reception of data through the network; inputting image data obtainable in accordance with the designated input mode; managing the storage of the data received in the receiving step and the image data inputted in the input step to the memory; and intervening between the operations of the reception step and the input step in accordance with the storage management.

In this way, the data reception operation and the image input operation are controlled in accordance with the current status of memory storage. Therefore, it becomes possible to deal with any sudden reception or the like during the storing of the image data on the memory, hence making the compatibility possible with respect to the immediacy of the image input, and the communication as well.

Item 7

Also, the reception step further comprises the step of receiving data through a wireless network.

In this manner, this method is arranged to be able to deal with communications on the wireless network.

Item 8

Also, the intervening step controls the input mode in the input step in accordance with the storage management.

In this manner, the method is arranged to be able to control the storing of the image data on the memory by changing the current input modes depending on the condition of the memory storage.

Item 9

Now, the aforesaid input step further comprises an image irreversible compression step, and the intervening means controls the compression ratio in the compression step.

In this manner, the method is arranged to control the amount of image data to be stored on the memory by changing the compression ratios depending on the current status of the memory storage.

Item 10

Furthermore, the managing means manages the remaining amount of the memory.

Hence, the method is arranged to control the data reception operation and the image input operation in accordance with the remaining capacity of the memory storage.

Item 11

Here, there are still other embodiments as given below.

An image input apparatus, which is provided with the communicating function, and storing on storage means an input image obtainable in accordance with the reception data provided by the communicating function and inputted in the photographing mode designated in advance, comprises image compression means for storing the storage means the input image at the compression ratio corresponding to the photographing means; reception amount generating means for obtaining the capacity required for the data reception by the communicating function; remainder generating means for obtaining the memory remainder for the storage means; and control means for controlling the compression ratios of the image compression means in accordance with the capacity obtained by the reception amount generating means, and the memory remainder obtained by the remainder generating means.

In this way, this apparatus is arranged to be able to heighten the compression ratio of the image compression means by changing the current photographing modes if, for example, the added value of the required capacity (estimated reception size) for the data reception and the data size of the input images predetermined by the current photographing mode (photographing quality mode) should be larger than the memory remainder. Therefore, it is possible to deal with any sudden reception during photographing, thus implementing the compatibility of immediacy between the photographing and communication.

Item 12

Also, an image input apparatus comprises input means for inputting the photographing mode; image input means for inputting an image obtained by the photographing mode inputted by the input means; image compression means for compressing the input image inputted by the image input means; communicating means for receiving arbitrary data; storage means for storing the input image compressed by the image compression means and the data received by the communicating means; remainder generating means for managing memory remainder of the storage means; and control means for controlling the compression ratios of the image compression means in accordance with the capacity obtained by the reception amount generating means, and the memory remainder obtained by the remainder generating means.

In this way, this apparatus is arranged to be able to compare the added value of the required capacity (estimated reception size) for the data reception and the data size of the input images predetermined by the current photographing mode (photographing quality mode) with the memory remainders currently available, and then, if it is found by the result of this comparison that such added value is larger than the memory remainders, the photographing mode is automatically changed so as to heighten the compression ratio to deal with any sudden reception during photographing. As a result, it becomes possible to implement conveniently the compatibility of immediacy between the photographing and communication.

Item 13

An image input apparatus, which is provided with the communicating function, and storing on storage means an input image obtainable in accordance with the reception data provided by the communicating function and inputted in the photographing mode designated in advance, comprises reception amount generating means for obtaining the required capacity for receiving data by the communicating function; remainder generating means for obtaining the memory remainder for the storage means; and control means for controlling the receiving operation of the communicating function in accordance with the capacity obtained by the reception amount generating means, and the memory remainder obtained by the remainder generating means.

In this way, it becomes possible to receive only a part of the estimated reception data in advance or heighten the compression ratio of the reception data in order to make the size of the reception data smaller if, for example, the added value of the required capacity (estimated reception size) for the data reception and the data size of the input images predetermined by the current photographing mode (photographing quality mode) should be larger than the memory remainders. Therefore, it is possible to deal with any sudden reception during photographing, thus implementing the compatibility of immediacy between the photographing and communication.

Item 14

An image input apparatus comprises input means for inputting the photographing mode; image input means for inputting an image obtained by the photographing mode inputted by the input means; image compression means for compressing the input image inputted by the image input means; communicating means for receiving arbitrary data; storage means for storing the input image compressed by the image compression means and the data received by the communicating means; remainder generating means for managing memory remainders of the storage means; reception amount generating means for obtaining the required capacity for receiving data by the communicating function; and control means for controlling the amount of reception data of the communicating means in accordance with the memory remainder obtained by the remainder generating means, and the capacity obtained by the reception amount generating means.

In this way, this apparatus is arranged to be able to compare the added value of the required capacity (estimated reception size) for the data reception and the data size of the input images predetermined by the current photographing mode (photographing quality mode) with the memory remainders currently available, and then, if it is found by the result of this comparison that such added value is larger than the memory remainders, the apparatus deals with any sudden reception during the photographing. More specifically, the apparatus performs the control so as to receive only a part of the estimated reception data or to heighten the compression ratio thereof, among some other controls. As a result, it becomes possible to implement conveniently the compatibility of immediacy between the photographing and communication.

Item 15

The aforesaid control means described in the item 13 or item 14 restricts the reception data if the added value of the capacity obtained by the reception amount generating means and the estimated size of the input image defined in advance by the photographing mode is larger than the memory remainder of the storage means.

Here, in this case, the amount of the reception data is restricted by the denial of the communication during the photographing or by some other means so as to enable the photographer to materialize his intention satisfactorily.

Item 16

The aforesaid control means described in the item 13 or item 14 restricts the amount of the reception data if the added value of the capacity obtained by the reception amount generating means and the estimated size of the input image defined in advance by the photographing mode is larger than the memory remainder of the storage means, and after that, the retransmission request of data is issued to the transmission side.

Item 17

The aforesaid control means described in the item 13 or item 14 enables the transmission side to transmit the data having higher compression ratio if the added value of the capacity obtained by the reception amount generating means and the estimated size of the input image defined in advance by the photographing mode is larger than the memory remainders of the storage means.

Item 18

The aforesaid control means described in the items 15 to 17 transmits to the transmission side the input image stored on the storage means.

Item 19

The aforesaid control means described in the item 13 or item 14 controls the reception denial when the reception data is the streaming data corresponding to the capacity obtained by the reception amount generating means.

Here, in this case, even if the reception of streaming data (for example, the real-time reception of conversations or some other streaming data) suddenly takes place during photographing, such reception is denied completely. Therefore, the priority is given to the fulfillment of the user's intention.

Item 20

The aforesaid control means described in the item 13 or item 14 controls the amount of the reception data when the added value of the data size of the predetermined numbers of input images, the capacity obtained by the reception amount generating means, and the estimated size of the input images predetermined by the photographing mode is larger than the memory remainders.

In this way, even if it is required that the communication and photographing should coexist for the intended operation, the area needed for the estimated numbers of images to be recorded is secured at all the time. Therefore, the photographer is able to concentrate his or her attention on photographing.

Item 21

There is provided an image processing apparatus described in any one of items 6 to 10 or an image input device described in any one of items 11 to 20.

Here, it becomes possible to provide a photographing apparatus capable of implementing the compatibility of immediacy between the photographing and communication.

Item 22

There is provided an image processing apparatus described in any one of items 6 to 10 or an image input device described in any one of items 11 to 20.

Here, it becomes possible to provide a photographing system capable of implementing the compatibility of immediacy between the photographing and communication.

Item 23

There is provided an image processing apparatus described in any one of items 6 to 10 or an image input device described in any one of items 11to 20.

Here, it becomes possible to provide a communicating device capable of implementing the compatibility of immediacy between the photographing and communication.

Item 24

There is provided an image processing apparatus described in any one of items 6 to 10 or an image input device described in any one of items 11 to 20.

Here, it becomes possible to provide a communicating system capable of implementing the compatibility of immediacy between the photographing and communication.

Item 25

A storage medium, which is provided with the processing steps readable by a computer on the memory, stores the input images obtainable by being inputted by the communicating function, the reception data through the communicating function, and the photographing mode designated in advance. The aforesaid processing steps comprises the steps of compressing images to be stored on the memory by compressing the input images with the compression ratio corresponding to the photographing mode; generating the reception amount for obtaining the required capacity for the data reception by the communicating function; generating remainder for obtaining the memory remainder of the memory; and controlling the compression ratio in the image compressing step in accordance with the photographing mode, the capacity obtained in the reception amount generating step, and the memory remainder obtained in the remainder generating step.

In this way, it is possible to heighten the compression ratio of the input images by changing the current photographing modes if, for example, the added value of the required capacity (estimated reception size) for the data reception and the data size of the input images predetemined by the current photographing mode (photographing quality mode) should be larger than the memory remainder. Therefore, it becomes possible to deal with any sudden reception during photographing, thus providing an apparatus or a system capable of implementing the compatibility of immediacy between the photographing and communication.

Item 26

A storage medium, which is provided with the processing steps readable by a computer, stores in memory the input images obtainable by being inputted by the communicating function, the reception data through the communicating function, and the photographing mode designated in advance. The aforesaid processing steps comprises the steps of generating the reception amount for obtaining the required capacity for the data reception by the communicating function; generating the remainder for obtaining the memory remainder of the memory; controlling the compression ratio in the image compressing step in accordance with the photographing mode, the capacity obtained in the reception amount generating step, and the memory remainder obtained in the remainder generating step.

In this manner, it is possible to receive only a part of the estimated reception data and heighten the compression ratio of the input images by changing the current photographing modes if, for example, the added value of the required capacity (estimated reception size) for the data reception and the data size of the input images predetermined by the current photographing mode (photographing quality mode) should be larger than the memory remainder. Therefore, it becomes possible to make the size of the reception data smaller to deal with any sudden reception during photographing, thus providing an apparatus or a system capable of implementing the compatibility of immediacy between the photographing and communication.

Item 27

A storage medium described in the item 26, the aforesaid the controlling step comprises the step of restricting the amount of reception data if the added value of the capacity obtained in the reception amount generating step and the estimated size of input images predetermined by the photographing mode is larger than the memory remainders.

Here, in this case, the amount of the reception data is restricted by the denial of the communication during the photographing or by some other means so as to enable the photographer to materialize his or her intention satisfactorily.

Item 28

The aforesaid controlling step described in the item 26 controls the reception denial when the reception data is streaming data corresponding to the capacity obtained in the reception amount generating step.

Here, in this case, even if the reception of streaming data (for example, the real time reception of conversations or some other streaming data) suddenly takes place during photographing, such reception is denied completely. Therefore, the priority is given to the fulfillment of the user's intention.

Item 29

The aforesaid the controlling step described in the item 26 comprises the step of restricting the amount of reception data when the added value of the data size of the predetermined numbers of input images, the capacity obtained by the reception amount generating step, and the estimated size of the input images predetermined by the photographing mode is larger than the memory remainder.

In this way, even if it is required that the communication and photographing should coexist for the intended operation, the area needed for the estimated numbers of images to be recorded is secured at all the time. Therefore, the photographer is able to concentrate his or her attention on photographing.

In this manner, it becomes possible to provide an apparatus or a system capable of implementing the compatibility of immediacy between the image input and the communication.

What is claimed is:

1. An image processing method comprising the steps of:
receiving data through a network;
generating amount data of the received data;
inputting image data obtained in accordance with a designated input mode;
managing storage of the data received in said receiving step and the image data inputted in said input step to a memory based on the generated amount data; and
intervening between operations of said receiving step and said inputting step on the basis of said storage management in said managing step.

2. A method according to claim 1, wherein said receiving step further comprises a step of receiving data through wireless net work.

3. A method according to claim 1, wherein said intervening step further comprises the control step of controlling the input mode in said inputting step on the basis of said storage management in said managing step.

4. A method according to claim 1, wherein said inputting step further comprises an image irreversible compression step, and wherein said intervening step further comprises a control step for controlling a compression ratio in said compression step.

5. A method according to claim 1, wherein said managing step further comprises a step of managing a remaining storage capacity of said memory.

6. A storage medium which stored the processing step of image processing method according to either one of claim 1 to claim 5 in being readable by a computer.

7. An image input apparatus having a communicating function, and for storing into storage means data received by said communicating function and an image inputted in a photographing mode designated in advance, comprising:
image compression means for storing into said storage means the input image at a compression ratio corresponding to the photographing mode;
reception amount generating means for obtaining a capacity required for a data reception by said communicating function;
remaining amount generating means for obtaining the memory remaining amount for said storage means; and
control means for controlling the compression ratio of said image compression means on the basis of the capacity obtained by said reception amount generating means, and the memory remaining amount obtained by said remaining amount generating means.

8. An image input apparatus, comprising:
input means for inputting a photographing mode;
image input means for inputting an image obtained in the photographing mode inputted by said input means;
image compression means for compressing the image inputted by said image input means;
communicating means for receiving arbitrary data;
storage means for storing the input image compressed by said image compression means and the data received by said communicating means;
remaining amount generating means for managing memory remaining amount of said storage means; and
control means for controlling an amount of the input image for said image compression means on the basis of photographing mode inputted by said input means, and the memory remaining amount obtained by said remaining amount generating means.

9. An image input apparatus having the communicating function, and for storing into storage means data received by said communicating function and an image inputted in the photographing mode designated in advance, comprising:

reception amount generating means for obtaining a capacity required for receiving data by said communicating function;

remaining amount generating means for obtaining a memory remaining amount for said storage means; and control means for controlling a receiving operation of said communicating function on the basis of the capacity obtained by said reception amount generating means, and the memory remaining amount obtained by said remaining amount generating means.

10. An image input apparatus according to claim 9, wherein said control means restricts the reception data when an added value of the capacity obtained by said reception amount generating means and an estimated size of the input image defined in advance in said photographing mode is larger than the memory remaining amount of said storage means.

11. An image input apparatus according to claim 9, wherein said control means restricts the amount of the reception data when an added value of the capacity obtained by said reception amount generating means and the estimated size of the input image defined in advance in said photographing mode is larger than the memory remaining amount of said storage means, and after that, a retransmission request of data is issued to a transmission side.

12. An image input apparatus according to claim 9, wherein said control means enables the transmission side to transmit the data having higher compression ratio when an added value of the capacity obtained by said reception amount generating means and the estimated size of the input image defined in advance by said photographing mode is larger than the memory remaining amount of said storage means.

13. An image input apparatus according to claim 10, wherein said control means transmits to a transmission side the input image stored into said storage means.

14. An image input apparatus according to claim 9, wherein said control means controls the reception denial when the reception data corresponding to the capacity obtained by said reception amount generating means is streaming data.

15. An image input apparatus according to claim 9, wherein said control means controls the amount of the reception data when the added value of the data size of the predetermined numbers of input images, the capacity obtained by said reception amount generating means, and an estimated size of the input images predetermined in said photographing mode is larger than the said memory remaining amount.

16. An image input apparatus, comprising:

input means for inputting a photographing mode;

image input means for inputting an image obtained in the photographing mode inputted by said input means;

image compression means for compressing the input image inputted by said image input means;

communicating means for receiving arbitrary data;

storage means for storing the input image compressed by said image compression means and the data received by said communicating means;

remaining amount generating means for managing memory remaining amount of said storage means;

reception amount generating means for obtaining a capacity required for receiving data by said communicating function; and control means for controlling the amount of reception data of said communicating means on the basis of the memory remaining amount obtained by said remaining amount generating means, and the capacity obtained by said reception amount generating means.

17. A storage medium which stored processing steps readable by a computer, for storing on memory a communicating function, reception data by the communication function, and an image inputted in a photographing mode designated in advance, said processing steps comprising the following steps of:

compressing the input image with a compression ratio corresponding to the photographing mode and storing the compressed image;

generating reception amount for obtaining a capacity required for the data reception by said communicating function;

generating remaining amount for obtaining the memory remaining amount of said memory; and controlling the compression ratio in said image compressing step on the basis of said photographing mode, the capacity obtained in said reception amount generating step, and the memory remaining amount obtained in said remaining amount generating step.

18. A storage medium which stored the processing steps readable by a computer for storing a communicating function, the reception data by said communicating function, and an image inputted in the photographing mode designated in advance, said processing steps comprising the following steps of:

generating the reception amount for obtaining a capacity required for the data reception by said communicating function;

generating the remaining amount for obtaining the memory remaining amount of said memory;

controlling a receiving operation by the comunication function on the basis of said photographing mode, the capacity obtained in said reception amount generating step, and the memory remaining amount obtained in said remaining amount generating step.

19. A storage medium according to claim 18, wherein said controlling step comprises the step of restricting an amount of reception data when the added value of the capacity obtained in said reception amount generating step and the estimated size of input image predetermined in said photographing mode is larger than said memory remaining amount.

20. A storage medium according to claim 18, wherein said controlling step controls the reception denial when the reception data corresponding to the capacity obtained in said reception amount generating step is streaming data.

21. A storage medium according to claim 18, wherein said controlling step comprises the step of restricting the amount of reception data when the added value of the data size of the predetermined numbers of input images, the capacity obtained in said reception amount generating step, and the estimated size of the input images predetermined in said photographing mode is larger than the said memory remaining amount.

* * * * *

UNITED STATES PATENT AND TRADEMARK OFFICE
CERTIFICATE OF CORRECTION

PATENT NO.    : 6,690,417 B1
DATED         : February 10, 2004
INVENTOR(S)   : Shigeo Yoshida et al.

It is certified that error appears in the above-identified patent and that said Letters Patent is hereby corrected as shown below:

<u>Title page,</u>
Item [56], References Cited, FOREIGN PATENT DOCUMENTS,
"06268582   9/1994" should read -- 06-268582   9/1994 --.

<u>Drawings,</u>
Sheet 19, Figure 19, "SIDE:TRANSMIT" should read -- SIDE: TRANSMIT -- and "RATIO,AND" should read -- RATIO, AND --.
Sheet 20, Figure 20, "DATA,AND" should read -- DATA, AND --.
Sheet 21, Figure 21, "SIDE:TRANSMIT" should read -- SIDE: TRANSMIT -- and "RATIO,AND" should read -- RATIO, AND --.

<u>Column 3,</u>
Line 61, "objectives,features" should read -- objectives, features --.

<u>Column 8,</u>
Line 39, "controlled," should read -- controlled --.

<u>Column 10,</u>
Line 46, "fob" should read -- job --.

<u>Column 11,</u>
Line 66, "accordance" should read -- accordance with --.

<u>Column 15,</u>
Line 37, "hang" should read -- having --.

<u>Column 17,</u>
Line 40, "switch." should read -- switch --.

<u>Column 19,</u>
Line 49, "server).for" should read -- server) for --.

<u>Column 20,</u>
Line 9, "by," should read -- by --.

<u>Column 21,</u>
Line 43, "which," should read -- which --.

UNITED STATES PATENT AND TRADEMARK OFFICE
CERTIFICATE OF CORRECTION

PATENT NO. : 6,690,417 B1
DATED : February 10, 2004
INVENTOR(S) : Shigeo Yoshida et al.

It is certified that error appears in the above-identified patent and that said Letters Patent is hereby corrected as shown below:

Column 22,
Line 25, "4ble" should read -- able --.

Column 26,
Line 27, "puncture," should read -- juncture, --.

Column 29,
Line 50, "also;" should read -- also, --.

Column 35,
Line 29, "the" (first occurrence) should be deleted; and
Line 51, "the" (second occurrence) should be deleted.

Column 36,
Line 29, "stored" should read -- stores --.

Signed and Sealed this

Twentieth Day of July, 2004

JON W. DUDAS
*Acting Director of the United States Patent and Trademark Office*